US010797578B2

(12) United States Patent
Wong

(10) Patent No.: US 10,797,578 B2
(45) Date of Patent: Oct. 6, 2020

(54) VERTICALLY MOUNTED AND MAGNETICALLY DRIVEN POWER GENERATION APPARATUS

(71) Applicant: Shou-Cheng Wong, Kaohsiung (TW)

(72) Inventor: Shou-Cheng Wong, Kaohsiung (TW)

( * ) Notice: Subject to any disclaimer, the term of this patent is extended or adjusted under 35 U.S.C. 154(b) by 331 days.

(21) Appl. No.: 15/962,296

(22) Filed: Apr. 25, 2018

(65) Prior Publication Data

US 2018/0351446 A1    Dec. 6, 2018

(30) Foreign Application Priority Data

Jun. 5, 2017  (TW) .............................. 106118530 A
Sep. 27, 2017 (TW) .............................. 106133139 A

(51) Int. Cl.
*H02K 3/46* (2006.01)
*H02K 7/02* (2006.01)
(Continued)

(52) U.S. Cl.
CPC ........... *H02K 53/00* (2013.01); *H02K 1/2793* (2013.01); *H02K 3/46* (2013.01); *H02K 7/025* (2013.01);
(Continued)

(58) Field of Classification Search
CPC ............ H02K 7/02; H02K 7/025; H02K 7/09; H02K 1/2793; H02K 3/46; H02K 5/04;
(Continued)

(56) References Cited

U.S. PATENT DOCUMENTS 2,747,944 A * 5/1956 Baermann ............... G01R 11/14
  310/90.5
4,035,659 A * 7/1977 Jeppson ................. H02K 7/025
  307/84
(Continued)

FOREIGN PATENT DOCUMENTS

DE         2136371 A1 *  2/1973  .......... F16C 32/0431
JP        55060719 A  *  5/1980  .......... F16C 32/0427
WO   WO-2011154623 A1 * 12/2011  .......... F16C 32/0429

OTHER PUBLICATIONS

Vangraefschepe, Machine Translation of WO2011154623, Dec. 2011 (Year: 2011).*
(Continued)

*Primary Examiner* — Quyen P Leung
*Assistant Examiner* — Eric Johnson
(74) *Attorney, Agent, or Firm* — WPAT, PC

(57) ABSTRACT

A vertically mounted and magnetically driven power generation apparatus includes a transmission mechanism vertically mounted in a support frame with a spindle thereof connected with a power generator. Multiple magnetic drive assemblies are respectively mounted inside multiple shelves of the support frame. By virtue of magnetic repulsion between the magnetic drive assemblies and multiple magnetic driven members mounted on the transmission mechanism, the spindle can be vertically and suspendedly rotated within the support frame. The power generation apparatus further includes multiple magnetically stabilizing modules that provide radial or axial magnetic repulsion to the transmission mechanism so as to reduce left-and-right swing or up-and-down vibration when the spindle is rotated within the support frame. Accordingly, the power generation apparatus can achieve superior stability and optimal power generation efficiency upon high-speed operation.

12 Claims, 14 Drawing Sheets

(51) Int. Cl.
  *H02K 7/18*   (2006.01)
  *H02K 16/00*  (2006.01)
  *H02K 53/00*  (2006.01)
  *H02K 1/27*   (2006.01)
  *H02K 5/04*   (2006.01)

(52) U.S. Cl.
  CPC ........... *H02K 7/1807* (2013.01); *H02K 16/00* (2013.01); *H02K 5/04* (2013.01)

(58) Field of Classification Search
  CPC .... H02K 7/1807; H02K 7/1853; H02K 16/00; F16C 32/0408; F16C 32/0423; F16C 32/0429; F16C 32/0431
  USPC ................................................ 310/90.5, 157
  See application file for complete search history.

(56) References Cited

U.S. PATENT DOCUMENTS

| | | | |
|---|---|---|---|
| 10,367,405 B2* | 7/2019 | Wong | F16C 32/0408 |
| 2006/0119198 A1* | 6/2006 | Chio | H02K 7/09 |
| | | | 310/90.5 |
| 2006/0214525 A1* | 9/2006 | Jansen | F16C 32/0493 |
| | | | 310/90.5 |
| 2006/0226725 A1* | 10/2006 | Wise | H02K 21/24 |
| | | | 310/156.35 |
| 2010/0253085 A1* | 10/2010 | Minowa | F03D 9/25 |
| | | | 290/55 |
| 2017/0146092 A1* | 5/2017 | Murphy | F16F 15/3156 |

OTHER PUBLICATIONS

Braun, Machine Translation of DE2136371, Feb. 1973 (Year: 1973).*

Iwata, Machine Translation of JP55060719, May 1980 (Year: 1980).*

* cited by examiner

VERTICALLY MOUNTED AND MAGNETICALLY DRIVEN POWER GENERATION APPARATUS

BACKGROUND OF THE INVENTION

1. Field of the Invention

The present invention relates to a power generation apparatus and, more particularly, to a vertically mounted and magnetically driven power generation apparatus.

2. Description of the Related Art

Conventional power generation apparatuses usually adopt a transmission assembly to transmit kinetic energy provided from a source of kinetic energy to a power generation unit thereof. Owing to energy loss arising from frictional resistance occurring in the transmission assembly, the kinetic energy provided by the source of kinetic energy fails to be effectively converted to electrical energy. As a result, for so long conventional power generation apparatuses have the drawbacks of ineffective power generation due to energy loss in the transmission assembly.

To cope with the issue of ineffective power generation in conventional power generation apparatuses, vertically mounted and magnetically driven power generation apparatuses have been brought into play ever since. Each such power generation apparatus includes a support frame with multiple shelves vertically arranged and multiple magnetic drive assemblies mounted inside conical through holes of the respective shelves, and a transmission shaft in connection with a power generator. The magnetic driven members mounted on the transmission shaft are driven by first magnetic drive members and second magnetic drive members of the respective magnetic drive assemblies by way of magnetic repulsion, such that the transmission shaft can stand upright and be rotated in a suspended and frictionless manner to enhance torque and rotation speed of the transmission shaft. Moreover, unnecessary energy loss in the transmission assembly can be reduced to ensure a better power generation efficiency.

However, the aforementioned vertically mounted and magnetically driven power generation apparatuses are prone to left and right swing along a radial direction upon rotation of the transmission shaft in the suspended and frictionless manner, especially when the transmission shaft is rotated at a high speed. Such radial swing is adverse to transmission of kinetic energy through the transmission shaft. Hence, operational stability of the vertically mounted and magnetically driven power generation apparatuses can be further improved.

SUMMARY OF THE INVENTION

An objective of the present invention is to provide a novel vertically mounted and magnetically driven power generation apparatus resolving the rotational instability of transmission mechanism in conventional vertically mounted and magnetically driven power generation apparatus arising from the issue of swing and vibration upon rotation thereof.

To achieve the foregoing objective, the vertically mounted and magnetically driven power generation apparatus includes a support frame, a transmission mechanism, multiple magnetic drive assemblies, at least one power generator, and multiple magnetically stabilizing modules.

The support frame has a center axis, multiple shelves, and multiple struts.

The center axis is vertically and centrally passing through the support frame.

The multiple shelves are vertically arranged and spaced apart from each other. Each shelf has a through hole formed through the shelf and tapering downwards.

The multiple struts are securely connected with the multiple shelves.

The transmission mechanism has a spindle and multiple magnetic driven members.

The spindle is vertically mounted through the support frame along the center axis.

The multiple magnetic driven members are securely mounted around the spindle and are located within the through holes of the respective shelves of the support frame.

The multiple magnetic drive assemblies are mounted in inner walls of the through holes of the respective shelves and are located around the respective magnetic driven members of the transmission mechanism with a gap defined between each magnetic drive assembly and a corresponding magnetic driven member. The transmission mechanism is vertically and suspendedly rotatable around the center axis by magnetic repulsion forces generated between the multiple magnetic drive assemblies and the respective magnetic driven members.

The at least one power generator is mounted in the support frame and is connected with the spindle of the transmission mechanism.

The multiple magnetically stabilizing modules are mounted in the support frame. Each magnetically stabilizing module has a positioning board, a first permanent magnet ring and an inner permanent magnet.

The positioning board is securely mounted to the multiple struts and has a center hole formed through the positioning board and aligned with the center axis.

The first permanent magnet ring is annularly mounted on an inner wall of the center hole of the positioning board.

The inner permanent magnet is securely mounted to the spindle of the transmission mechanism, is located within the first permanent magnet ring, and is spaced apart from the first permanent magnet ring by gaps in a contactless manner by way of magnetic repulsion in a radial direction.

Preferably, each of the at least one power generator includes an upper rotor and a lower rotor.

The upper rotor and the lower rotor are securely mounted around the spindle of the transmission mechanism, are vertically spaced apart from each other, and are rotated along with the spindle with respect to the center axis.

The upper rotor has an upper rotor body and multiple upper permanent magnets.

The upper rotor body takes the form of a truncated cone tapering upwards.

The multiple upper permanent magnets are mounted on a bottom surface of the upper rotor body, are distributed in rows aligned in multiple radial directions, and progressively increase in diameter in a radial direction from a center to a rim of the upper rotor.

The lower rotor is symmetrical to the upper rotor according to an up-down symmetry and has a lower rotor body and multiple lower permanent magnets.

The lower rotor body takes the form of a truncated cone tapering downwards.

The multiple lower permanent magnets are mounted on a top surface of the lower rotor body, are distributed in rows aligned in multiple radial directions, and progressively increase in diameter in a radial direction from a center to a rim of the lower rotor.

The power generator further includes an inner stator securely mounted in the support frame, located between the upper rotor and the lower rotor, and having an inner stator board and multiple inner stator windings.

The inner stator board is securely mounted in the support frame, is located between the bottom surface of the upper rotor body and the top surface of the lower rotor body, and is mounted through by the spindle of the transmission mechanism.

The multiple inner stator windings are mounted inside the inner stator board and spread over an area thereon covering all the rows of the multiple upper permanent magnets and the multiple lower permanent magnets.

Preferably, each of the at least one power generator includes multiple inner stators and a center rotor.

The multiple inner stators are mounted between the upper rotor and the lower rotor.

The center rotor is mounted between adjacent two of the multiple inner stators and has a center rotor body and multiple center permanent magnets.

The center rotor body takes the form of a disc.

The multiple center permanent magnets are mounted on a top surface and a bottom surface of the center rotor body and are distributed in rows aligned in multiple radial directions. The center permanent magnets in each row of the multiple center permanent magnets progressively increase in diameter in a radial direction from a center to a rim of the center rotor, and the multiple inner stator windings of each inner stator spread over an area covering all rows of the multiple center permanent magnets of the center rotor.

Preferably, the power generator includes two outer stators respectively mounted above the upper rotor and below the lower rotor, and each outer stator has an outer stator board and an outer stator winding set.

The outer stator board is securely mounted in the support frame.

The outer stator winding set is mounted inside the outer stator board.

The upper rotor further includes an outer upper permanent magnet mounted on a top portion of the upper rotor body and located within the outer stator winding set of one of the two outer stators.

The lower rotor further includes an outer lower permanent magnet mounted on a bottom portion of the lower rotor body and located within the outer stator winding set of the other outer stator.

Each of the at least one power generator includes multiple inner stators and a center rotor.

The multiple inner stators are mounted between the upper rotor and the lower rotor.

The center rotor is mounted between adjacent two of the multiple inner stators and has a center rotor and multiple center permanent magnets.

The center rotor body takes the form of a disc.

The multiple center permanent magnets are mounted on a top surface and a bottom surface of the center rotor body and are distributed in rows aligned in multiple radial directions. The center permanent magnets in each row of the multiple center permanent magnets progressively increase in diameter in a radial direction from a center to a rim of the center rotor, and the multiple inner stator windings of each inner stator spread over an area covering all rows of the multiple center permanent magnets of the center rotor.

Preferably, each magnetically stabilizing module further includes two second permanent magnet rings securely mounted inside the positioning board and vertically spaced apart from each other by a gap. The first permanent magnet ring and the inner permanent magnet are located between the two second permanent magnet rings, and the inner permanent magnet is suspended among the first permanent magnet ring and the two second permanent magnet rings by way of magnetic repulsion in an axial direction along the center axis.

Preferably, the positioning board includes a top plate, a middle plate and a bottom plate sequentially stacked to each other, a center hole aligned with the center axis is formed through the top plate, the middle plate and the bottom plate, the first permanent magnet ring is mounted on an inner wall portion of the center hole inside the middle plate, the two second permanent magnet rings are respectively mounted on inner wall portions of the center hole inside the top plate and the bottom plate, each of the first permanent magnet ring and the two second permanent magnet rings has a bore centrally formed therethrough, and the bore of the first permanent magnet ring is smaller than the bores of the two second permanent magnet rings in bore diameter, the inner permanent magnet is radially spaced apart from the first permanent magnet ring and is axially spaced apart from the two second permanent magnet rings above and below the inner permanent magnet, an outer diameter of the inner permanent magnet is greater than the bore diameter and is smaller than an outer diameter of the second permanent magnet rings, the inner permanent magnet and the two second permanent magnet rings above and below the inner permanent magnet in the axial direction are magnetically repulsed to each other by having same magnetic polarities, and the inner permanent magnet and the first permanent magnet ring located around the inner permanent magnet are magnetically repulsed to each other by having same magnetic polarities.

Preferably, each of the at least one power generator includes an upper rotor, at least one center rotor, a lower rotor, multiple inner stators and two outer stators.

The upper rotor, the at least one center rotor and the lower rotor are securely mounted around the spindle of the transmission mechanism, are vertically spaced apart from each other, and are rotated along with the spindle with respect to the center axis.

The upper rotor has an upper rotor body and multiple upper permanent magnets.

The upper rotor body takes the form of a truncated cone tapering upwards.

The multiple upper permanent magnets are mounted on a bottom surface of the upper rotor body, are distributed in rows aligned in multiple radial directions, and progressively increase in diameter in a radial direction from a center to a rim of the upper rotor.

The lower rotor is symmetrical to the upper rotor according to an up-down symmetry and has a lower rotor body and multiple permanent magnets.

The lower rotor body takes the form of a truncated cone tapering downwards.

The multiple lower permanent magnets are mounted on a top surface of the lower rotor body, are distributed in rows aligned in multiple radial directions, and progressively increase in diameter in a radial direction from a center to a rim of the lower rotor.

Each of the at least one center rotor is mounted between adjacent two of the multiple inner stators and has a center rotor body and multiple center permanent magnets.

The center rotor body takes the form of a disc.

The multiple center permanent magnets are mounted on a top surface and a bottom surface of the center rotor body and are distributed in rows aligned in multiple radial directions.

The multiple inner stators securely mounted in the support frame and are respectively located between the upper rotor and a topmost one of the multiple center rotors, between every adjacent two of the multiple center rotors, and between a bottommost one of the multiple center rotors and the lower rotor, and each inner stator has an inner stator board and multiple inner stator windings.

The inner stator board is securely mounted to the struts of the support frame, and is mounted through by the spindle of the transmission mechanism.

The multiple inner stator windings are mounted inside the inner stator board and spread over an area thereon covering all the rows of the multiple upper permanent magnets, the multiple center permanent magnets, and the multiple lower permanent magnets.

The two outer stators are respectively mounted above the upper rotor and below the lower rotor, and each outer stator has an outer stator board and an outer stator winding set.

The outer stator board is securely mounted in the support frame.

The outer stator winding set is mounted inside the outer stator board.

The upper rotor further includes an outer upper permanent magnet mounted on a top portion of the upper rotor body and located within the outer stator winding set of one of the two outer stators.

The lower rotor further includes an outer lower permanent magnet mounted on a bottom portion of the lower rotor body and located within the outer stator winding set of the other outer stator.

Preferably, each magnetic driven member is a permanent magnet and has an upper driven portion and a lower driven portion.

The upper driven portion is a truncated cone tapering upwards.

The lower driven portion has a top connected with a bottom of the upper driven portion, is a truncated cone tapering downwards, and is symmetrical to the upper driven portion according to an up-down symmetry.

A ridge line is formed on a junction between the upper driven portion and the lower driven portion, and takes a form of a circle.

The upper driven portion and the lower driven portion have different magnetic polarities.

Each magnetic drive assembly includes a first magnetic drive member and a second magnetic drive member mounted in the inner wall of the through hole of a corresponding shelf with a bottom of the first magnetic drive member adjacent to a top of the second magnetic drive member. A gap exists between a corresponding magnetic driven member and each of the first magnetic drive member and the second magnetic drive member.

Each first magnetic drive member is a permanent magnet, takes an annular or conical form, and includes an upper pole portion and a lower pole portion.

Each second magnetic drive member has multiple permanent magnets, and the permanent magnets of the second magnetic drive member are bar-shaped and are annularly mounted in the inner wall of the through hole of a corresponding shelf to take the form of a truncated cone. The inner surface of each bar-shaped permanent magnet facing a corresponding magnetic driven member is parallel to the peripheral surface of the lower driven portion of the corresponding magnetic driven member. Each bar-shaped permanent magnet of the second magnetic drive member has an inner pole portion proximate to the center axis and an outer pole portion distal to the center axis, and the inner pole portion and the lower driven portion of the corresponding magnetic driven member have identical magnetic polarity.

The ridge line of each magnetic driven member is aligned with a junction between the upper pole portion and the lower pole portion of a corresponding first magnetic drive member, and a bottom surface of the lower driven portion of each magnetic driven member is aligned with a middle portion of an inner surface of a corresponding second magnetic drive member.

Preferably, the support frame further includes a top board and a bottom board located at a top portion and a bottom portion thereof and opposed to each other, the multiple shelves and the positioning boards of the multiple magnetically stabilizing modules are located between the top board and the bottom board, and the spindle has a top end and a bottom end in point contact with a bottom surface of the top board and a top surface of the bottom board respectively.

Preferably, the power generation apparatus further comprises at least one motor. Each of the at least one motor includes a rotor and two stators.

The rotor is securely mounted to the spindle of the transmission mechanism and has a flywheel body and two permanent magnets.

The flywheel body is disc-shaped, has an up-down symmetry, and includes a top portion and a bottom portion.

The top portion is disc-shaped and tapers upwards.

The bottom portion is formed on a bottom surface of the top portion, is disc-shaped, tapers downwards, and is symmetrical to the top portion according to an up-down symmetry.

The two permanent magnets are respectively mounted on a top and a bottom of the flywheel body.

The two stators are respectively located on a top end and a bottom end of the rotor. Each stator has a winding-fixing board and a winding set.

The winding set is mounted inside the winding-fixing board.

The two permanent magnets of the rotor respectively mounted on the top end and the bottom end of the rotor and are located within the winding sets of the respective stators.

The benefits achieved by the present invention include the transmission mechanism vertically mounted in the support frame, the at least one power generator connected with the transmission mechanism, and multiple magnetic drive assemblies mounted inside the respective shelves of the support frame for the transmission mechanism to be vertically and suspendedly rotated within the support frame in a frictionless manner as a result of magnetic repulsion effect generated between the magnetic drive assemblies and the magnetic driven members of the transmission mechanism. In addition, in view of such vertically assembled structure, the vertically mounted and magnetically driven power generation apparatus can effectively reduce a ground area occupied thereby and can be therefore installed in a factory with a limited space.

The vertically mounted and magnetically driven power generation apparatus further includes multiple magnetically stabilizing modules mounted inside the support frame and providing radial magnetic repulsion to the transmission mechanism, thereby reducing left-and-right swing of the transmission mechanism upon rotation in the support frame, enhancing rotational stability upon high-speed operation, and attaining improved power generation efficiency.

The vertically mounted and magnetically driven power generation apparatus further includes a top board and a bottom board mounted in the support frame, and the spindle of the transmission mechanism has a top end and a bottom end in point contact with the top board and the bottom board respectively to further enhance the rotational stability of the transmission mechanism upon rotation.

The vertically mounted and magnetically driven power generation apparatus further includes at least one motor. The rotor of each of the at least one motor has a flywheel body being disc-shaped with an up-down symmetry, such that good rotational stability of the rotor of the motor can be maintained upon high-speed rotation. Also because the flywheel body of the rotor is securely mounted on the spindle, the rotational stability and rotational inertia of the transmission mechanism can be further enhanced.

In the event that the vertically mounted and magnetically driven power generation apparatus is a large-size power generation apparatus, each magnetically stabilizing module can further include two second permanent magnet rings securely mounted inside the positioning board and vertically spaced apart from each other by a gap. Additionally, the first permanent magnet ring and the inner permanent magnet are located between the two second permanent magnet rings, and the inner permanent magnet is suspended among the first permanent magnet ring and the two second permanent magnet rings by way of magnetic repulsion in an axial direction along the center axis, such that the transmission mechanism can be suspended within the support frame by the axial magnetic repulsion effect. By virtue of the axial repulsion effect provided by the two second permanent magnet rings of the magnetically stabilizing module to the transmission mechanism, up-and-down vibration generated upon rotation of the transmission mechanism can be reduced, thereby increasing rotational stability of the transmission mechanism vertically suspended in the support frame and enhancing the power generation efficiency.

Other objectives, advantages and novel features of the invention will become more apparent from the following detailed description when taken in conjunction with the accompanying drawings.

DETAILED DESCRIPTION OF THE INVENTION

Figure 1:
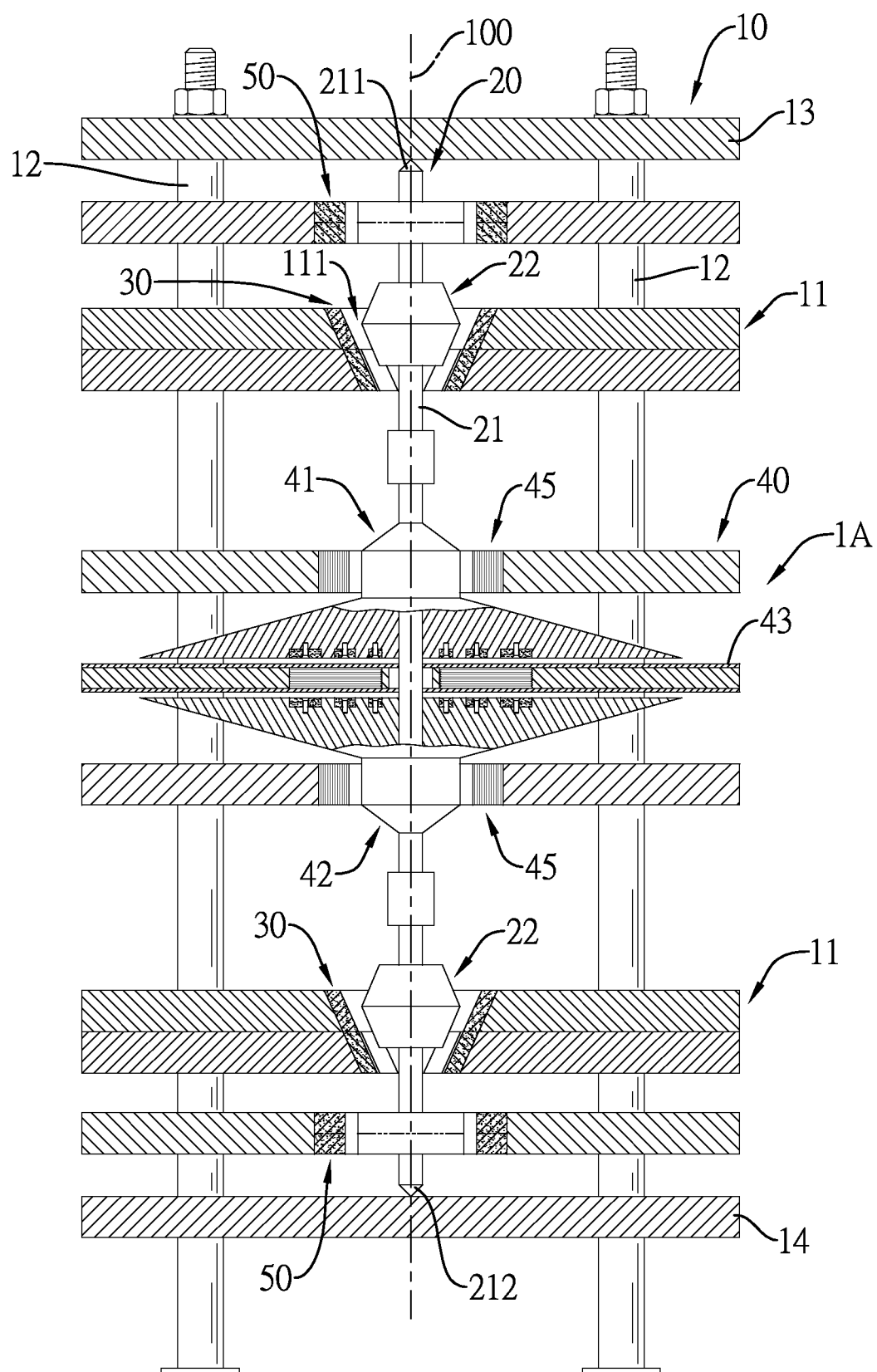
FIG. 1 is a cross-sectional view of a first embodiment of a vertically mounted and magnetically driven power generation apparatus in accordance with the present invention.
Figure 2:
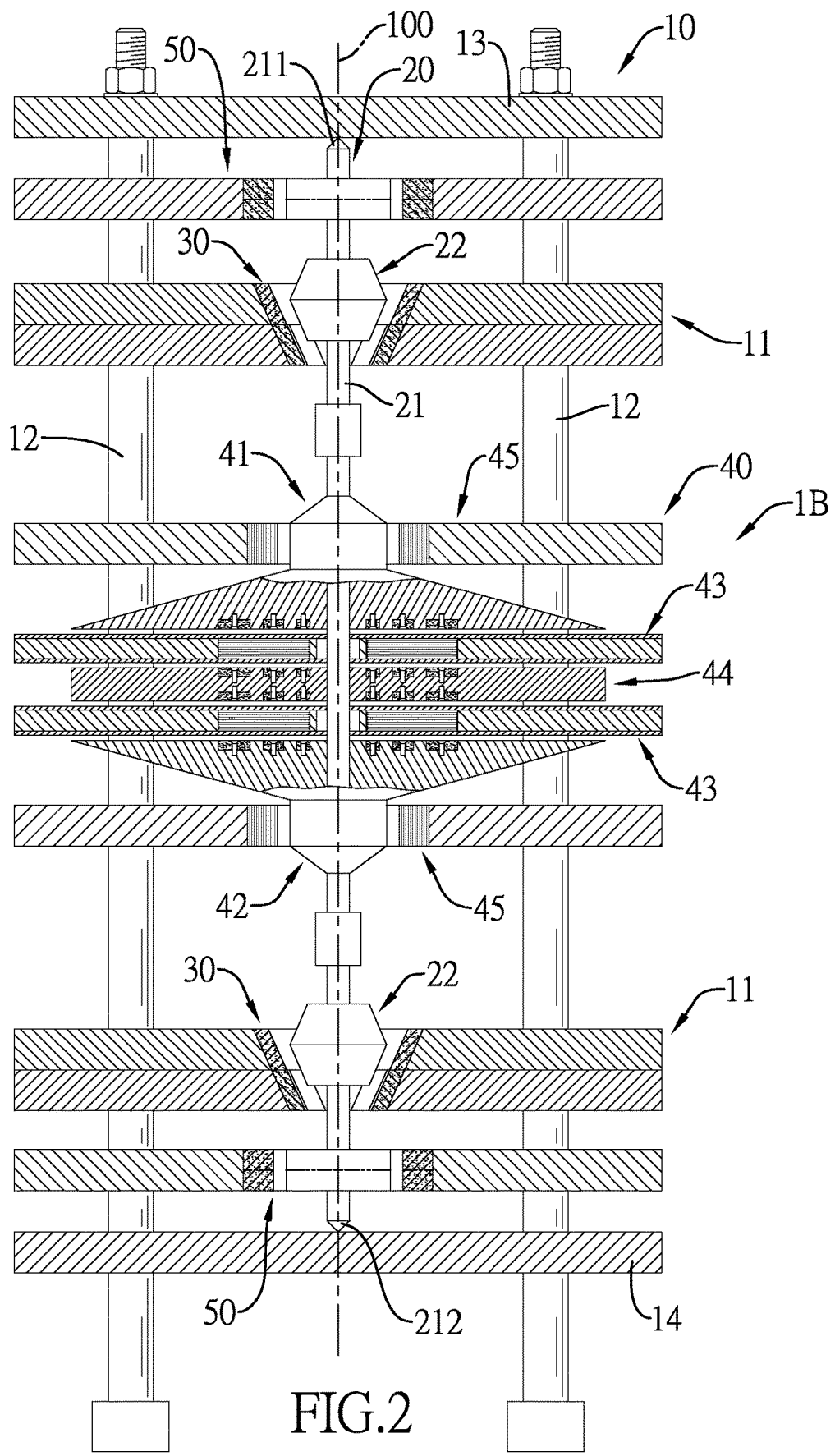
FIG. 2 is a cross-sectional view of a second embodiment of a vertically mounted and magnetically driven power generation apparatus in accordance with the present invention.
Figure 8:
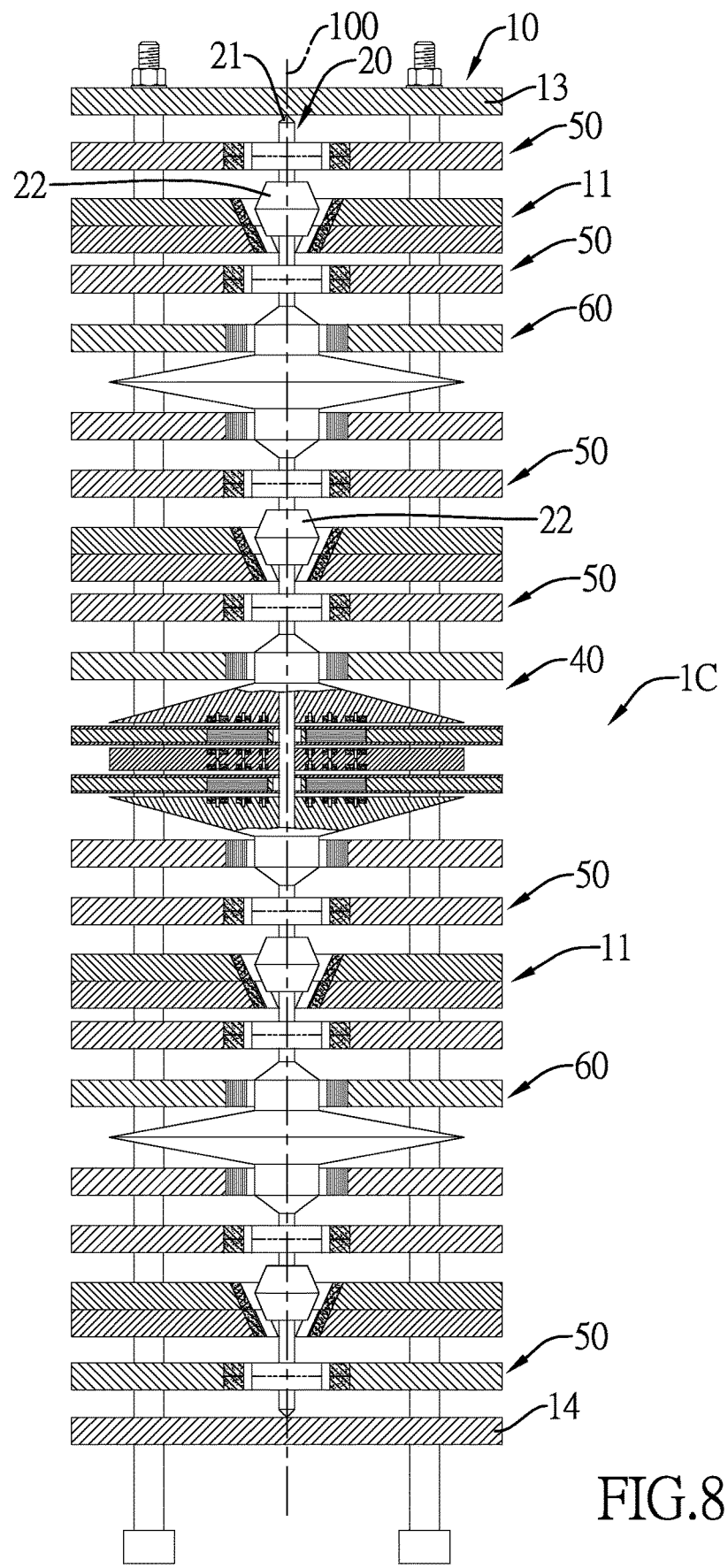
FIG. 8 is a cross-sectional view of a third embodiment of a vertically mounted and magnetically driven power generation apparatus in accordance with the present invention.

With reference to FIGS. 1, 2 and 8, three embodiments 1A-1C of a vertically mounted and magnetically driven power generation apparatus in accordance with the present invention are shown. Each embodiment 1A-1C of the vertically mounted and magnetically driven power generation apparatus includes a support frame 10, a transmission mechanism 20, multiple magnetic drive assemblies 30, a power generator 40 and multiple magnetically stabilizing modules 50.

With reference to FIGS. 1 and 2, the support frame 10 includes multiple shelves 11 and multiple struts 12. The multiple shelves 11 are vertically arranged and are vertically spaced apart from each other. The multiple struts 12 are securely connected with the multiple shelves 11 to support the multiple shelves 11. The support frame 10 has a center axis 100 vertically and centrally passing through the support frame 10. Each shelf 11 has a through hole 111 that is formed through the shelf 11, tapers downwards, and may be a truncated conic via hole or a truncated pyramid-like via hole.

Figure 3:
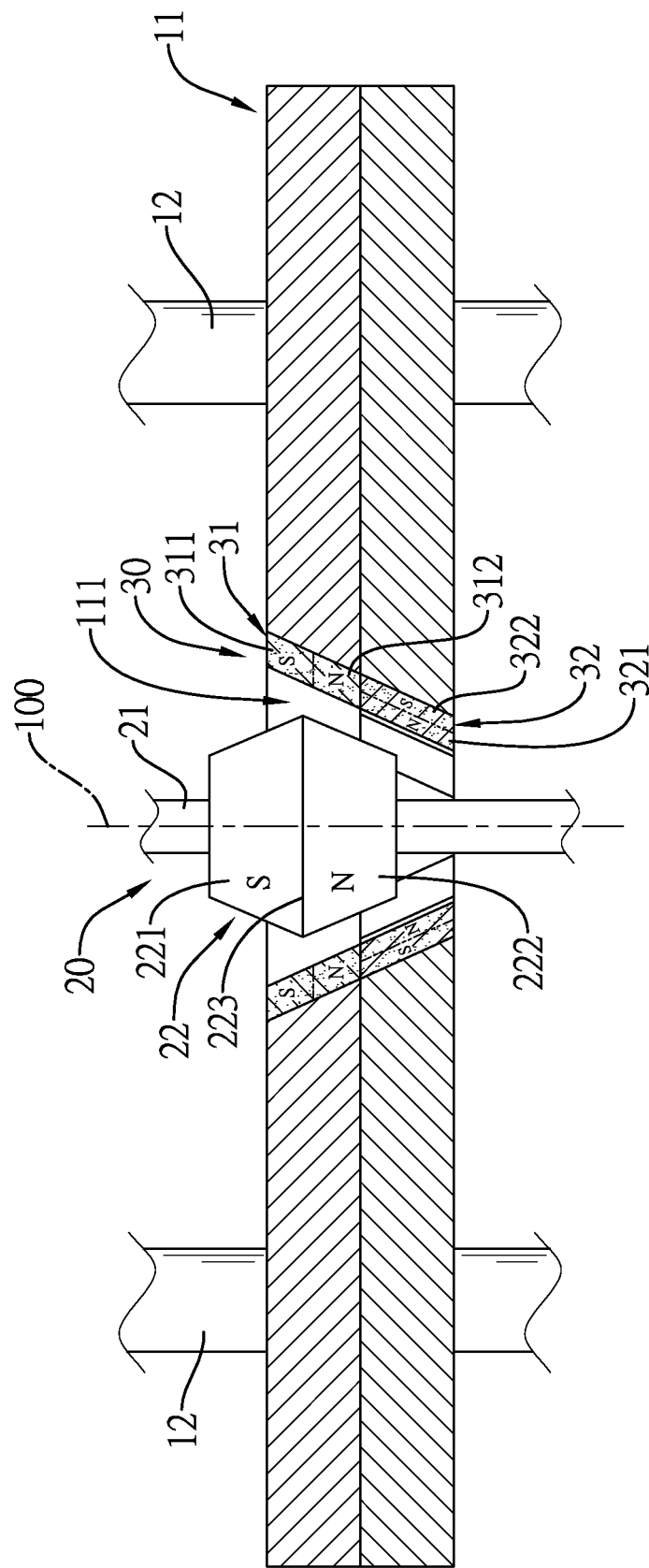
FIG. 3 is an enlarged cross-sectional view of a magnetic drive assembly and a support frame in FIGS. 1 and 2.

With further reference to FIGS. 1 and 3, the support frame 10 further includes a top board 13 and a bottom board 14 located at a top portion and a bottom portion thereof and opposed to each other. The multiple shelves 11 and the multiple struts 12 are located between the top board 13 and the bottom board 14. The multiple struts 12 are securely connected with the top board 13 and the bottom board 14.

With further reference to FIGS. 1 and 2, the transmission mechanism 20 is vertically mounted through the support frame 10 along the center axis 100 and includes a spindle 21 and multiple magnetic driven members 22. The spindle 21 may take the form of a single shaft or multiple shafts sequentially connected to each other by shaft couplers, and is vertically mounted through the support frame 10 along the center axis 100. The multiple magnetic driven members 22 are securely mounted around the spindle 21 and are located within the through holes 111 of the respective shelves 11.

With reference to FIGS. 1, 2 and 3, the magnetic driven members 22 may be permanent magnets. Each magnetic driven member 22 has an upper driven portion 221 and a lower driven portion 222. A top of the lower driven portion 222 is connected with a bottom of the upper driven portion 221. The lower driven portion 222 may be a truncated cone or a truncated pyramid tapering downwards. The upper driven portion 221 may be a truncated cone or a truncated pyramid tapering upwards. A ridge line 223 is formed on a junction between the upper driven portion 221 and the lower driven portion 222 and takes the form of a circle or all sides of a regular polygon. The shapes of the upper driven portion 221 and the lower driven portion 222 are symmetrical with respect to the ridge line 223. The upper driven portion 221 and the lower driven portion 222 have different magnetic poles. The lower driven portion 222 of each magnetic driven member 22 is mounted inside the through hole 111 of a corresponding shelf 11, and a top of the upper driven portion 221 of the magnetic driven member 22 extends beyond a top surface of the corresponding shelf 11 through a top opening of the through hole 111.

The spindle 21 has a top end 211 and a bottom end 212, which are conical or hemispherical and are in point contact with a bottom surface of the top board 13 and a top surface of the bottom board 14. An included angle between the center axis 100 and each of a peripheral surface of the lower driven portion 222 and a peripheral surface of the upper driven portion 221 is in a range of 15° to 75°. Preferably, the included angle associated with each of the upper driven portion 221 and the lower driven portion 222 is 30°, 45° or 60°.

With reference to FIGS. 1, 2, 3 and 8, the multiple magnetic drive assemblies 30 are mounted in inner walls of the through holes 111 of the respective shelves 11. The number of the multiple magnetic drive assemblies 30 corresponds to that of the multiple magnetic driven members 22. Each magnetic drive assembly 30 includes a first magnetic drive member 31 and a second magnetic drive member 32 mounted in the inner wall of the through hole 111 of a corresponding shelf 11 with a bottom of the first magnetic drive member 31 adjacent to a top of the second magnetic drive member 32. In other words, the first magnetic drive member 31 is located in an upper portion of the through hole 111, and the second magnetic drive member 32 is located in a lower portion of the through hole 111. The first magnetic drive member 31 and the second magnetic drive member 32 are adjacent to but have no contact with the lower driven portion 222 of a corresponding magnetic driven member 22 by way of mutual magnetic repulsion. Inner surfaces of the first magnetic drive member 31 and the second magnetic drive member 32 facing the lower driven portion 222 of the corresponding magnetic driven member are parallel to the peripheral surface of the lower driven portion 222. A gap exists between the lower driven portion 222 and each of the first magnetic drive member 31 and the second magnetic drive member 32 of a corresponding magnetic drive assembly 30. The weight of the transmission mechanism 20 is offset by the magnetic repulsion occurring between the multiple magnetic drive assemblies 30 and the multiple magnetic driven members 22 on the transmission mechanism 20, such that the transmission mechanism 20 can be vertically and suspendedly mounted through the support frame 10 and the transmission mechanism 20 is rotatable around the center axis 100. By virtue of the first magnetic drive member 31 and the second magnetic drive member 32 of each magnetic drive assembly 30, a force of magnetic attraction generated between the first magnetic drive member 31 and a corresponding magnetic driven member 22, and a force of magnetic repulsion respectively generated between the second magnetic drive member 32 and the corresponding magnetic driven member 22, the transmission mechanism 20 can be vertically and stably rotated around the center axis 100.

With further reference to FIG. 3, each first magnetic drive member 31 is a permanent magnet and takes an annular or conical form. The inner surface of the annular permanent magnet facing a corresponding magnetic driven member 22 is parallel to the peripheral surface of the lower driven portion 222 of the corresponding magnetic driven member 22. An outer periphery of the annular permanent magnet is mounted in an upper portion of the inner wall of a corresponding through hole 111. An included angle between the inner surface of the first magnetic drive member 31 facing the corresponding magnetic driven member 22 and the center axis 100 is in a range of 15° to 75°, and 30°, 45° or 60° is preferable.

Each first magnetic drive member 31 includes an upper pole portion 311 and a lower pole portion 312. The upper pole portion 311 and the lower pole portion 312 are annularly mounted in the inner surface of the through hole 111 and are located around a corresponding magnetic driven member 22. The upper pole portion 311 and the lower pole portion 312 are spaced apart from the lower driven portion 222 of the corresponding magnetic driven member 22 by a gap. The upper pole portion 311 and the lower driven portion 222 of the corresponding magnetic driven member 22 have different magnetic poles. The lower pole portion 312 and the lower driven portion 222 of the corresponding magnetic driven member 22 have identical magnetic poles. Thus, the upper pole portion 311 and the lower pole portion 312 provide a force of magnetic attraction and a force of magnetic repulsion relative to the lower driven portion 222 of the corresponding magnetic driven member 22. When the upper driven portion 221 and the lower driven portion 222 of the corresponding magnetic driven member 22 are the magnetic south pole S and the magnetic north pole N respectively, the upper pole portion 311 and the lower pole portion 312 are the magnetic south pole S and the magnetic north pole N respectively.

Each second magnetic drive member 32 has multiple permanent magnets each being bar-shaped and annularly mounted in the inner wall of the through hole 111 of a corresponding shelf 11 to take the form of a truncated cone or a truncated pyramid, such that the inner surface of the bar-shaped permanent magnet facing a corresponding magnetic driven member 22 may be a flat surface or a curved surface and is parallel to the peripheral surface of the lower driven portion 222 of the corresponding magnetic driven member 32. An included angle between the surface of each bar-shaped permanent magnet and the center axis 100 is in a range of 15° to 75° and is 30°, 45° or 60° preferably.

Each bar-shaped permanent magnet of the second magnetic drive member 32 has an inner pole portion 321 proximate to the center axis 100 and an outer pole portion 322 distal to the center axis 100. The inner pole portion 321 and the outer pole portion 322 are spaced apart from the lower driven portion 222 of a corresponding magnetic driven member 22 by a gap. The inner pole portion 321 and the lower driven portion 322 of the corresponding magnetic driven member 22 have an identical magnetic pole, such that a force of magnetic repulsion is provided to the lower driven portion 222 of the corresponding magnetic driven member 22. Supposing that the upper driven portion 221 and the lower driven portion 222 of the corresponding magnetic driven member 22 are the magnetic south pole S and the magnetic north pole N respectively and the upper pole portion 311 and the lower pole portion 312 of the bar-shaped permanent magnet have the magnetic south pole S and the magnetic north pole N respectively, the inner pole portion 321 and the outer pole portion 322 have the magnetic north pole N and the magnetic south pole S.

The ridge line 223 of each magnetic driven member 22 is aligned with a junction between the upper pole portion 311 and the lower pole portion 312 of a corresponding first magnetic drive member 31, and a bottom surface of the lower driven portion 222 of each magnetic driven member 22 is aligned with a middle portion of an inner surface of a corresponding second magnetic drive member 32.

With reference to FIGS. 1, 2, 4, 6 and 8, the power generator 40 may be purely a power-generating apparatus or an apparatus featuring as both a motor and a power generator (so called electrical motor-generator), is mounted in the support frame 10, is connected with the spindle 21 of the transmission mechanism 20, and is located between adjacent two of the multiple magnetic drive assemblies 30 along the center axis 100. The power generator 40 includes an upper rotor 41, a lower rotor 42 and at least one inner stator 43.

Figure 4:
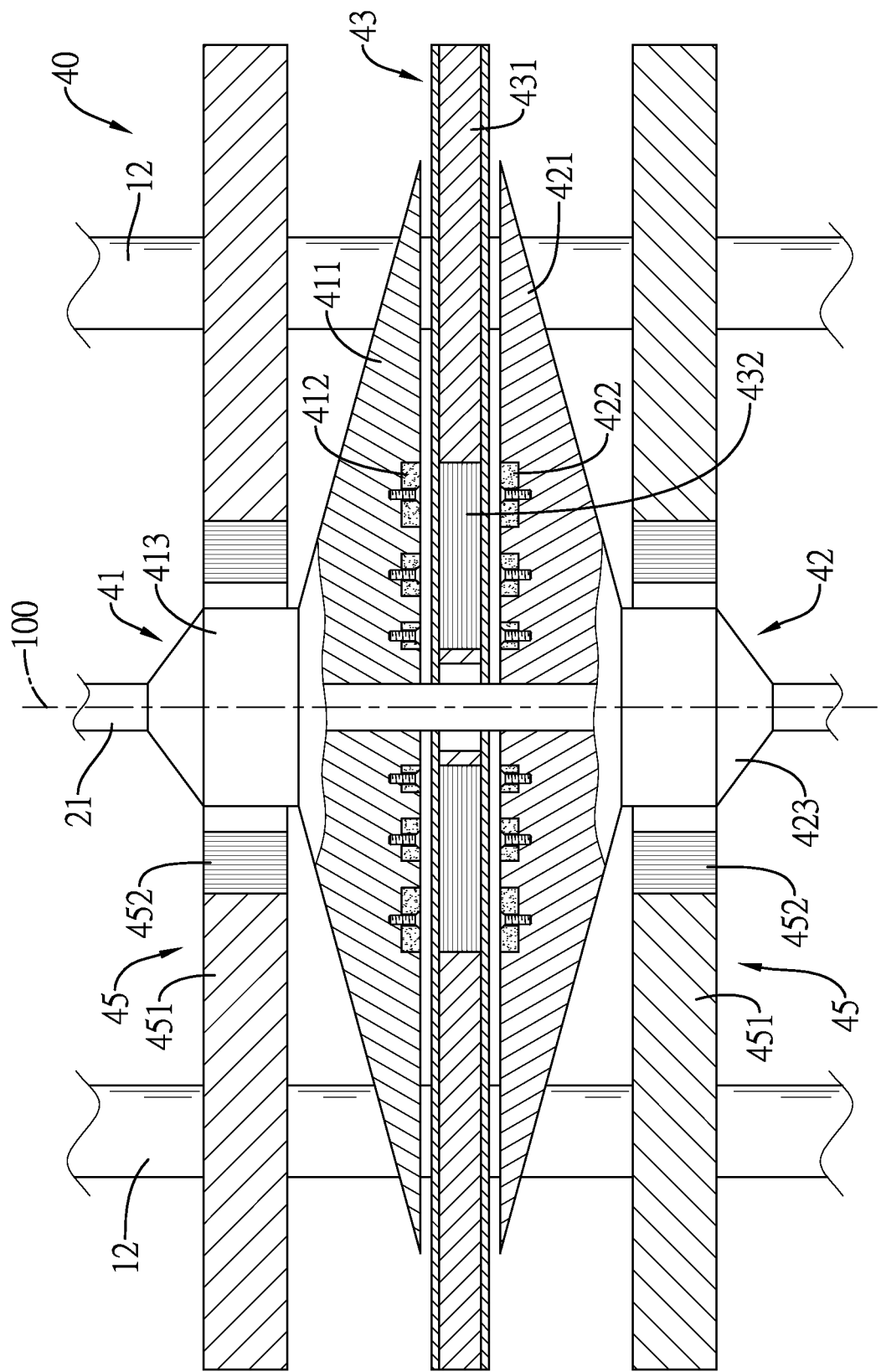
FIG. 4 is an enlarged cross-sectional view of a power generator in FIG. 1.
Figure 5:
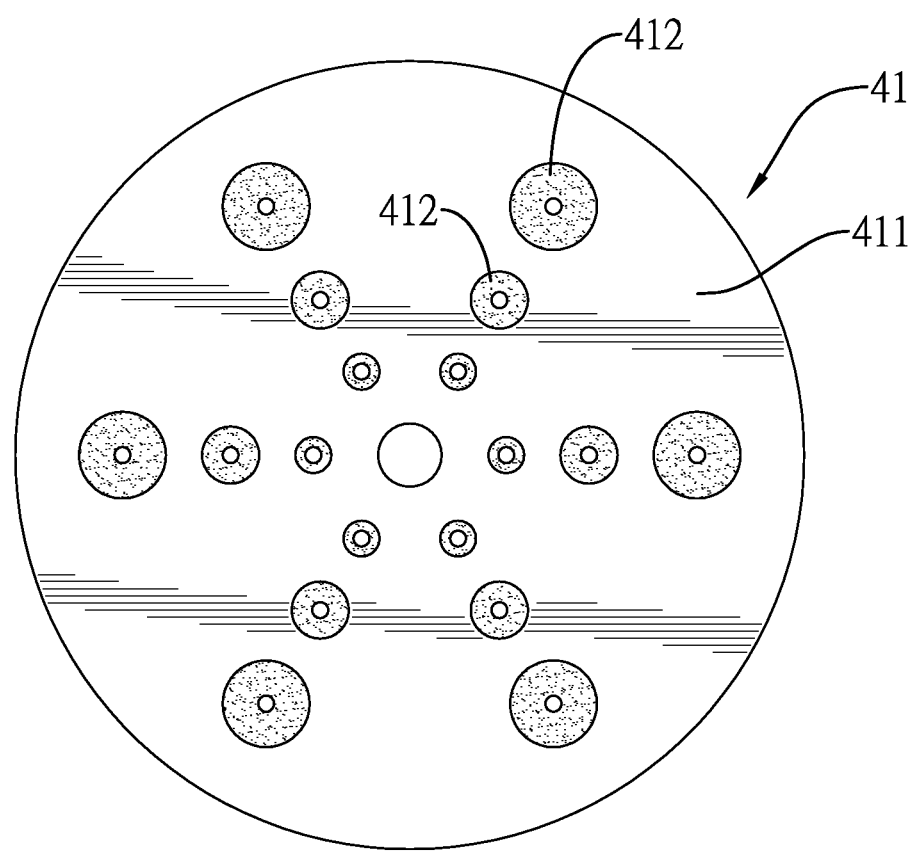
FIG. 5 is a top view of a top rotor of the power generator in FIG. 4.

The upper rotor 41 and the lower rotor 42 are vertically spaced apart from each other, and are securely mounted around the spindle 21. The upper rotor 41 and the lower rotor 42 are rotated along with the spindle 21 with respect to the center axis 100. The upper rotor 41 includes an upper rotor body 411 and multiple upper permanent magnets 412. With reference to FIGS. 4 and 5, the upper rotor body 411 is made of plastic steel and takes the form of a truncated cone tapering upwards. The multiple upper permanent magnets 412 are mounted on a bottom surface of the upper rotor body 411 and are distributed in rows aligned in multiple radial directions. The diameters of the upper permanent magnets 412 in each row of the multiple upper permanent magnets 412 progressively increase in a radial direction from a center to a rim of the upper rotor 41.

The lower rotor 42 is symmetrical to the upper rotor 41 in shape. The lower rotor 42 includes a lower rotor body 421 and multiple lower permanent magnets 422. The lower rotor body 421 is made of plastic steel and takes the form of a truncated cone tapering downwards. The multiple lower permanent magnets 422 are mounted on a top surface of the lower rotor body 421 and are distributed in rows aligned in multiple radial directions. The diameters of the lower permanent magnets 422 in each row of the multiple lower permanent magnets 422 progressively increase in a radial direction from a center to a rim of the lower rotor 42.

The at least one inner stator 43 is securely mounted in the support frame 10, is located between the upper rotor 41 and the lower rotor 42, the number of the at least one inner stator 43 is one in FIG. 1 and two in FIGS. 2 and 8, and each of the at least one inner stator 43 includes an inner stator board 431 and multiple inner stator windings 432. The inner stator board 431 is securely mounted in the support frame 10 and is located between the bottom surface of the upper rotor body 411 of the upper rotor 41 and the top surface of the lower rotor body 421 of the lower rotor 42. The inner stator board 431 is mounted through by the spindle 21 of the transmission mechanism 20. The multiple inner stator windings 432 are mounted inside the inner stator board 431 and spread over an area thereon covering all the rows of the multiple upper permanent magnets 412 and the multiple lower permanent magnets 422.

With reference to FIGS. 1, 2, 4 and 6, the power generator 40 further includes two outer stators 45 respectively mounted above the upper rotor 41 and below the lower rotor 42. Each outer stator 45 has an outer stator board 451 and an outer stator winding set 452 mounted inside the outer stator board 451. The outer stator board 451 is securely mounted in the support frame 10. The upper rotor 41 further includes an outer upper permanent magnet 413 mounted on a top portion of the upper rotor body 411 and located within the outer stator winding set 452 of one of the two outer stators 45. The lower rotor 42 further includes an outer lower permanent magnet 423 mounted on a bottom portion of the lower rotor body 421 and located within the outer stator winding set 452 of the other outer stator 45.

Figure 6:
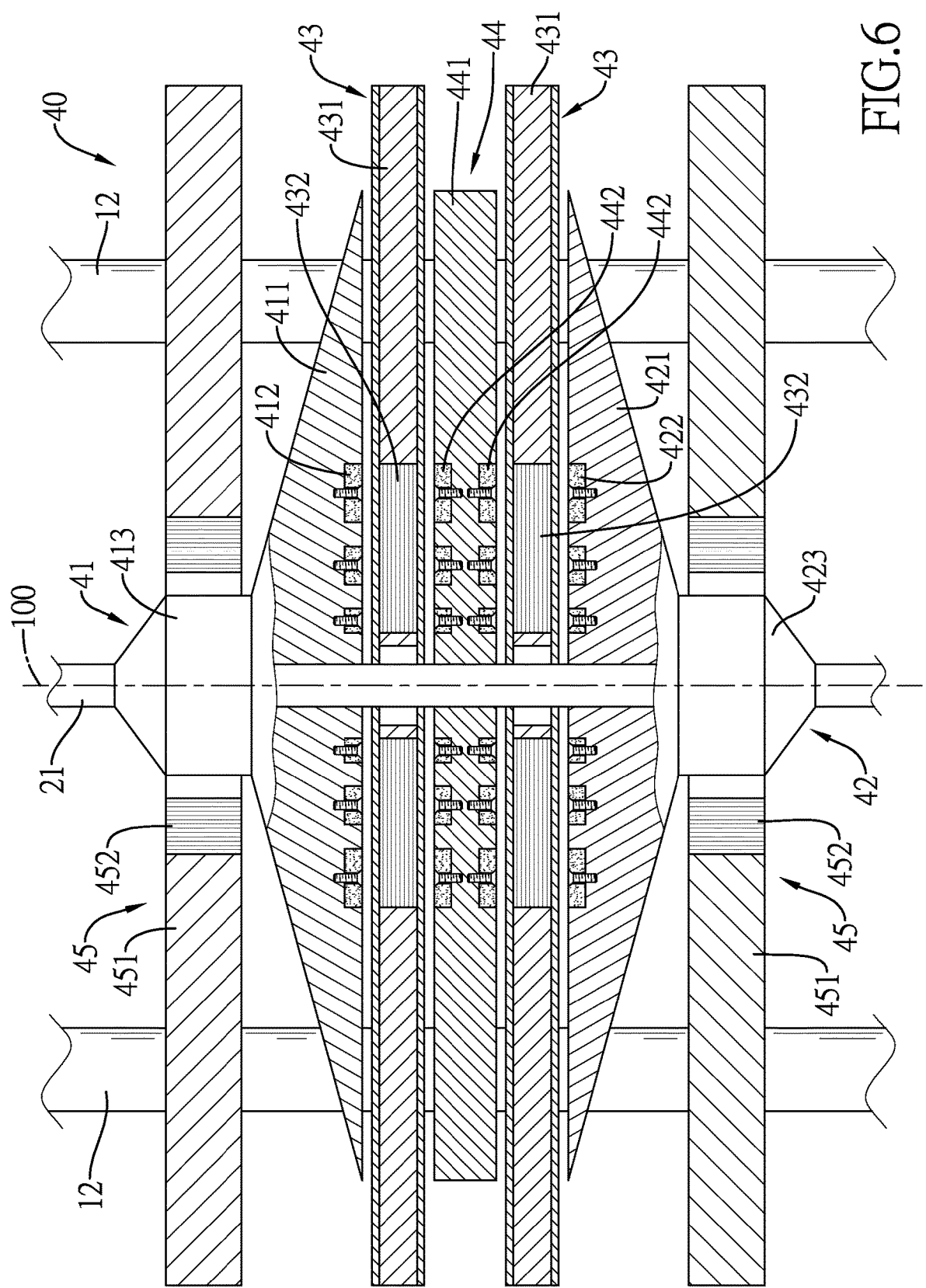
FIG. 6 is an enlarged cross-sectional view of a power generator in FIG. 2.
Figure 7:
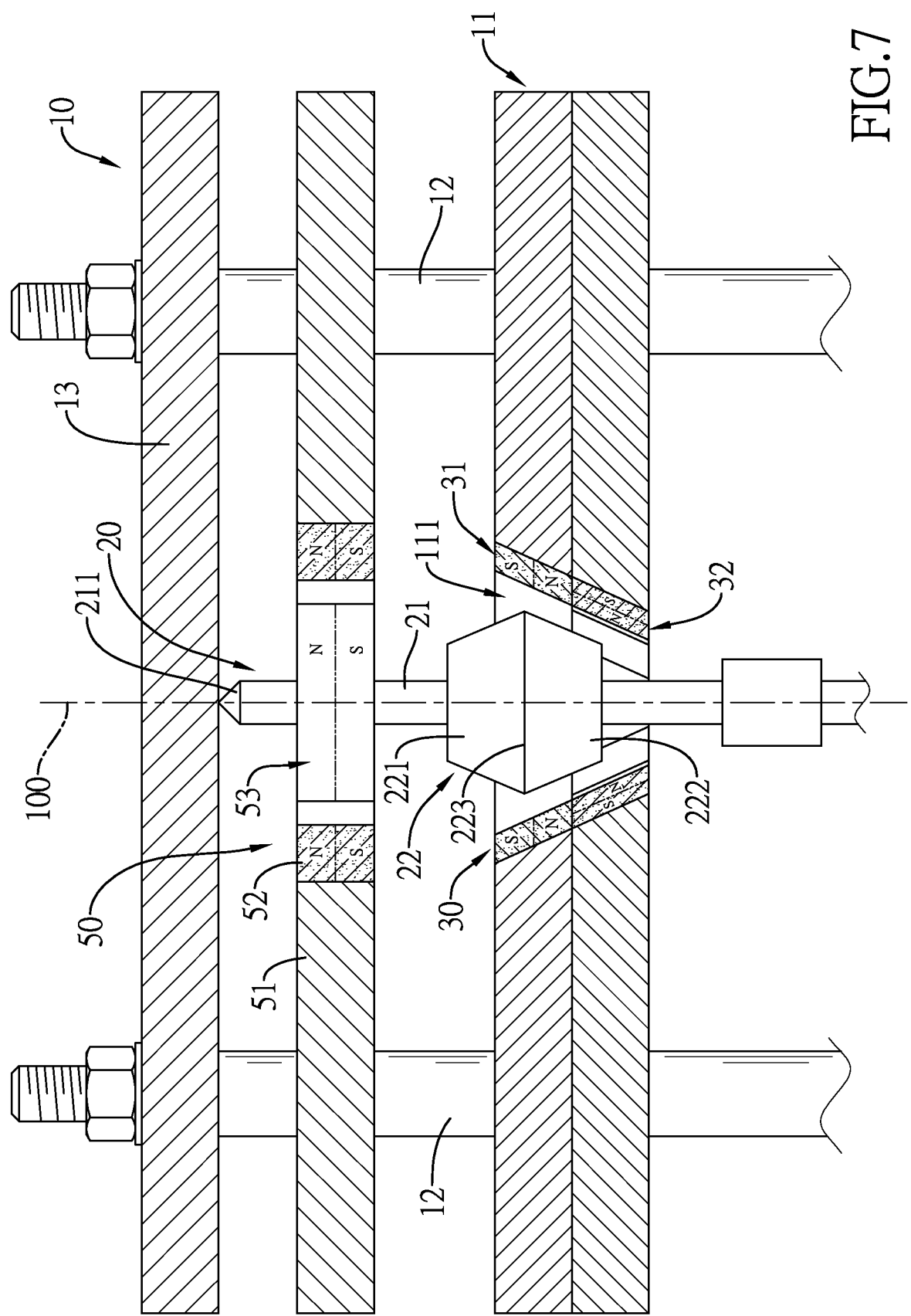
FIG. 7 is an enlarged cross-sectional view of a magnetically stabilizing module, the magnetic drive assembly and the support frame in FIGS. 1 and 2.

With reference to FIGS. 2, 6 and 8, the power generator 40 can further include a center rotor 44 mounted between the two inner stators 43. The center rotor 44 includes a center rotor body 441 and multiple center permanent magnets 442. The center rotor body 441 takes the form of a disc and is made of plastic steel. The multiple center permanent magnets 442 are mounted on a top surface and a bottom surface of the center rotor body 441 and are distributed in rows aligned in multiple radial directions. The diameters of the center permanent magnets 442 in each row of the multiple center permanent magnets 442 progressively increase in a radial direction from a center to a rim of the center rotor 44. The multiple inner stator windings 432 of each inner stator 43 are spread over an area covering all rows of the multiple center permanent magnets 442 of the center rotor 44.

With reference to FIGS. 1, 2, 7 and 8, the multiple magnetically stabilizing modules 50 are mounted in the support frame 10 and are located between the top board 13 and the bottom board 14. Locations of the multiple magnetically stabilizing modules 50 to be distributed depend on actual operation demands. Each magnetically stabilizing module 50 includes a positioning board 51, a first permanent magnet ring 52, and an inner permanent magnet 53. The positioning board 51 is securely mounted to the struts 12 of the support frame 10. A center hole aligned with the center axis 100 is formed through the positioning board 51. The first permanent magnet ring 52 is annularly mounted on an inner wall of the center hole of the positioning board 51. The inner permanent magnet 53 is securely mounted to the spindle 21 of the transmission mechanism 20, is located within the first permanent magnet ring 52, and is spaced apart from the first permanent magnet ring 52 by gaps in a contactless manner by way of magnetic repulsion in a radial direction.

Figure 9:
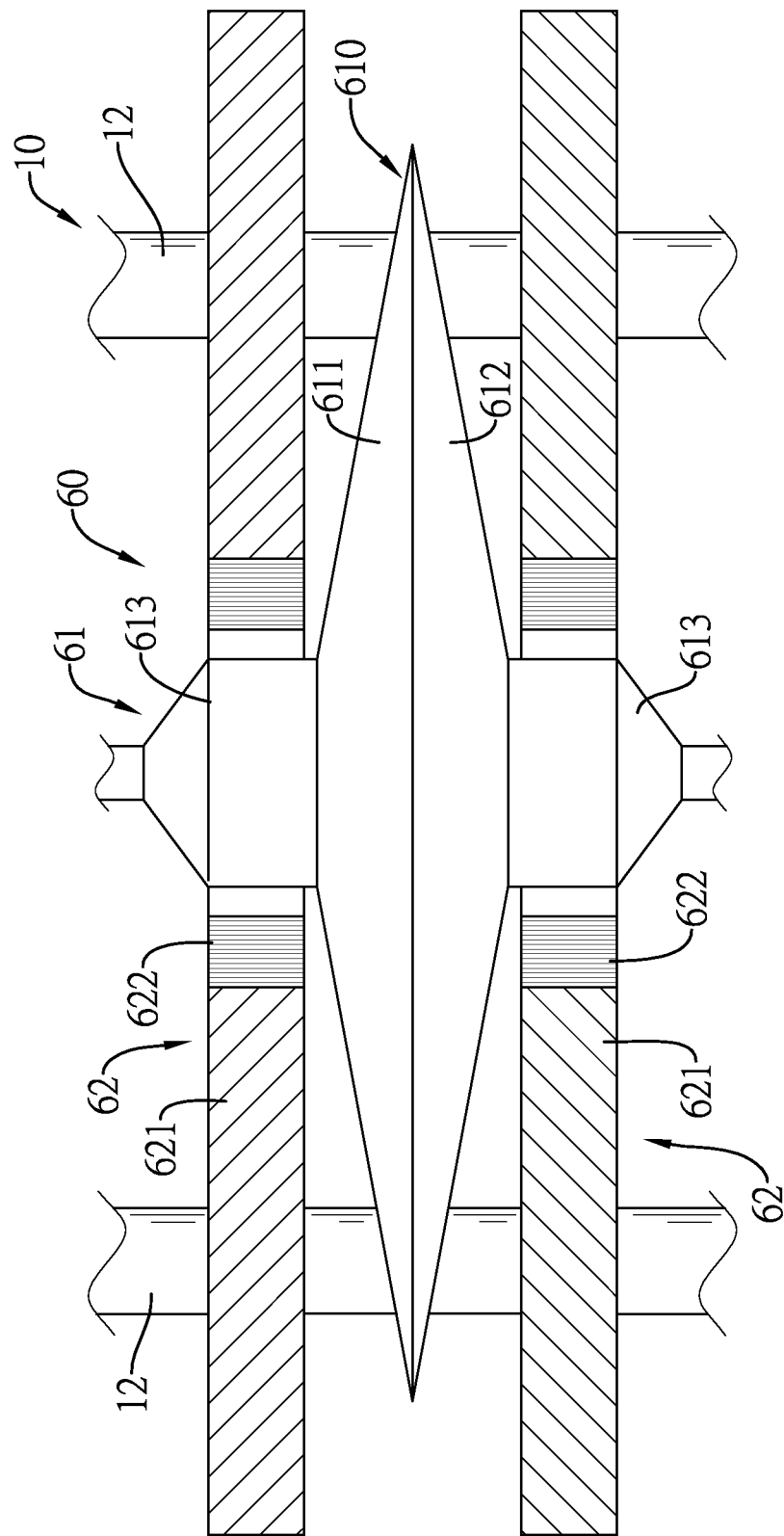
FIG. 9 is an enlarged cross-sectional view of a power generator in FIG. 8.

With reference to FIGS. 8 and 9, the vertically mounted and magnetically driven power generation apparatus 1C further includes at least one motor 60. Each of the at least one motor 60 includes a rotor 61 and two stators 62. The rotor 61 is securely mounted to the spindle 21 of the transmission mechanism 20. The two stators 62 are respectively located on a top end and a bottom end of the rotor 61. The rotor 61 has a flywheel body 610 and two permanent magnets 613. The two permanent magnets 613 are respectively mounted on a top and a bottom of the flywheel body 610. The flywheel body 610 is disc-shaped having an up-down symmetry and includes a top portion 611 and a bottom portion 612 formed on a bottom surface of the top portion 611. The top portion 611 is disc-shaped and tapers upwards, and the bottom portion 612 is also disc-shaped and tapers downwards and is symmetrical to the top portion 611. Preferably, the flywheel body 610 is greater than the upper rotor 41 and the lower rotor 42 of the power generator 40 in diameter. Each stator 62 has a winding-fixing board 621 and a winding set 622 mounted inside the winding-fixing board 621. The two permanent magnets 613 respectively mounted on the top end and the bottom end of the rotor 61 are located within the winding sets 622 of the respective stators 62.

With reference to FIGS. 1, 2 and 8, when the power generation apparatus 1A, 1B, 1C is operated, it is possible to connect the spindle 21 of the transmission mechanism 20 to a source of kinetic energy to receive kinetic energy and rotate the transmission mechanism 20, or the motor 60 outputs rotational kinematic energy to the transmission mechanism 20. To lower air resistance when the power generation apparatus 1A, 1B, 1C is operated, the power generation apparatus 1A, 1B, 1C can be mounted in a vacuum environment.

As being subject to the magnetic force exerted by the multiple magnetic drive assemblies 30, the transmission mechanism 20 is vertically and suspendedly mounted inside the support frame 10 and is rotated around the center axis 100 of the support frame 10 so as to further rotate the upper rotor 41 and the lower rotor 42 of the power generator 40 within the support frame 10 around the center axis 100. When the power generation apparatus 1A, 1B, 1C is operated, the upper rotor 41, the lower rotor 42, and/or the center rotor 44 mounted to the transmission mechanism 20 and the flywheel body 610 of the motor 60 are driven to rotate and simultaneously store electrical energy, the source of kinetic energy or the motor 60 stops outputting rotational kinematic energy once the transmission mechanism 20 and the power generator 40 reach a specific rotation speed. The upper rotor 41, the lower rotor 42, and/or the center rotor 44 mounted to the transmission mechanism 20 and the flywheel body 610 of the motor 60 can be still rotated by rotational inertia for a while. In view of almost no friction loss between the support frame 10 and the transmission mechanism 20, the transmission mechanism 20 can be driven to output a higher torque or a higher rotation speed.

When the transmission mechanism 20 is rotated, in the power generator 40 the upper permanent magnets 412, the lower permanent magnets 422 and/or the center permanent magnets 442 are moved relative to the inner stator windings 432 of the inner stator 43, or the inner stator windings 432 cut the lines of magnetic force of the upper permanent magnets 412, the lower permanent magnets 422 and/or the center permanent magnets 442 to generate an electromotive force for the purpose of power generation.

With reference to FIGS. 1, 2 and 8, the power generation apparatus 1A, 1B, 1C utilizes the multiple magnetically stabilizing modules 50 to provide magnetic repulsion force between the support frame 10 and the transmission mechanism 20 in a radial direction for maintaining rotational stability of the transmission mechanism 20. Moreover, the top end 211 and the bottom end 212 of the spindle 21 of the transmission mechanism 20 are used in point contact with the top board 13 and the bottom board 14 of the support frame 10 respectively to secure rotation of the transmission mechanism 20 at fixed points. On the other hand, owing to the upper rotor 41, the lower rotor 42, and/or the center rotor 44 mounted to the transmission mechanism 20 and the flywheel body 610 of the motor 60 with the up-down symmetry, the transmission mechanism 20 as a whole can be stably rotated.

Figure 10:
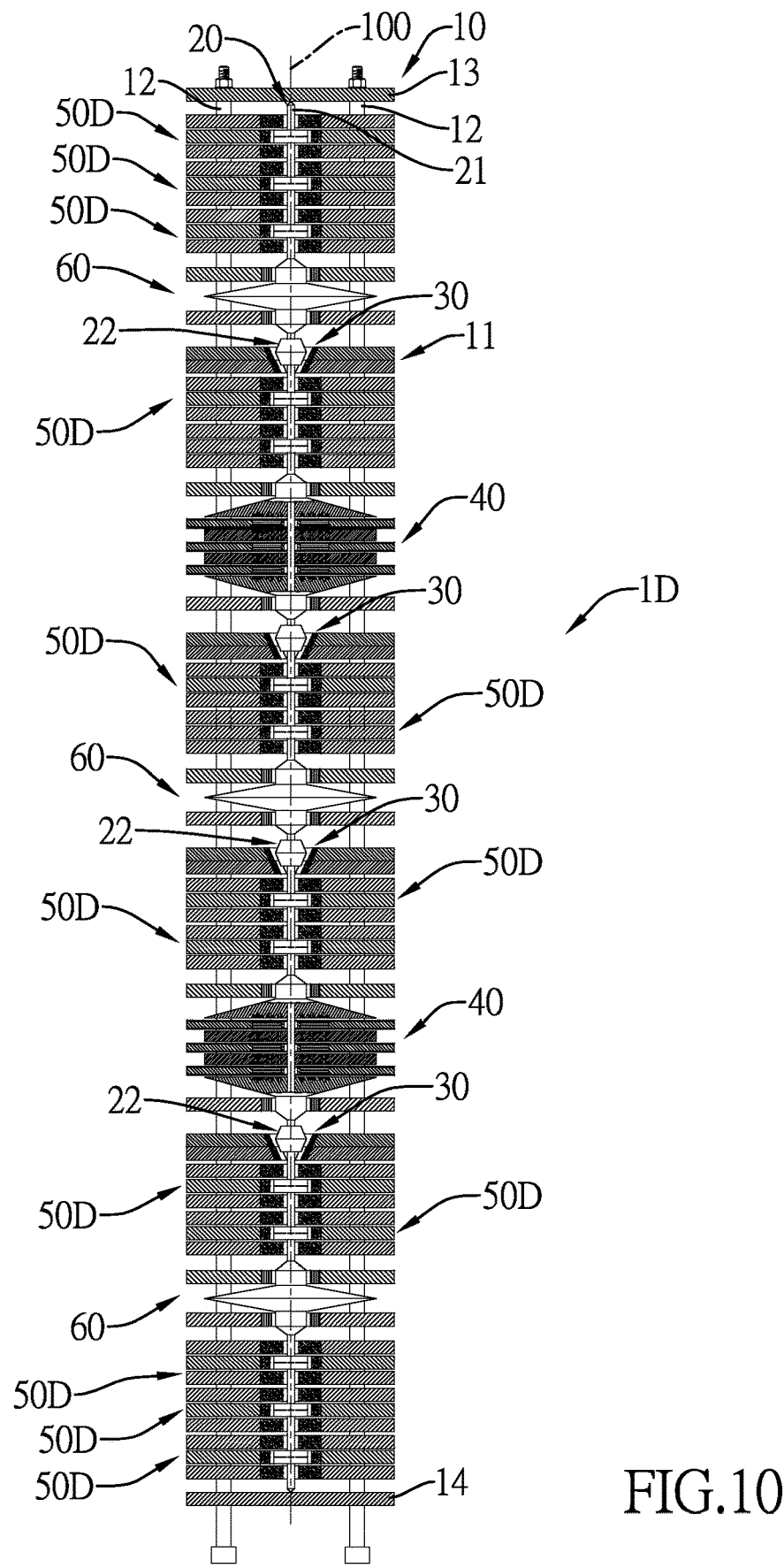
FIG. 10 is a cross-sectional view of a fourth embodiment of a vertically mounted and magnetically driven power generation apparatus in accordance with the present invention.
Figure 11:
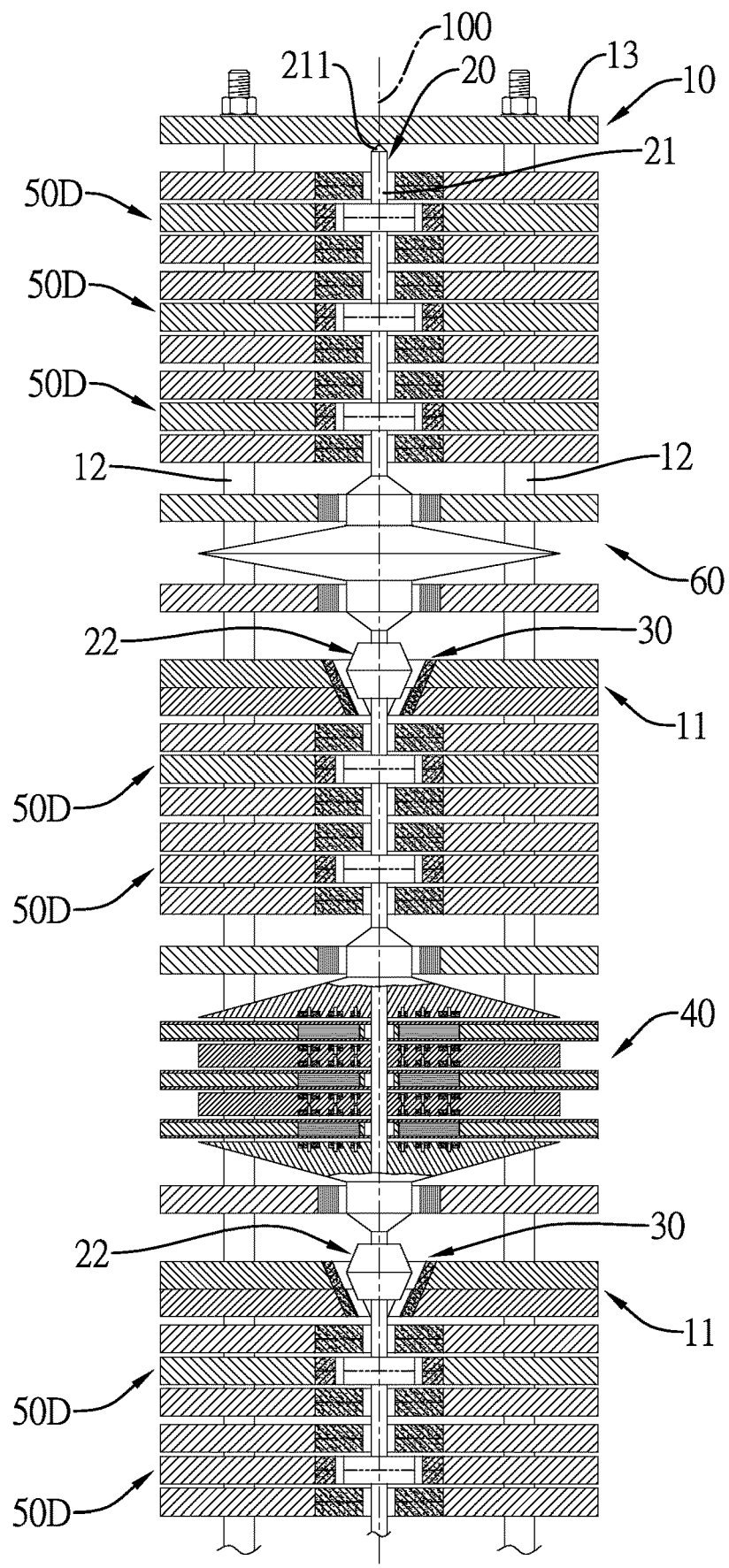
FIG. 11 is an enlarged cross-sectional view of an upper portion of the vertically mounted and magnetically driven power generation apparatus in FIG. 10.
Figure 12:
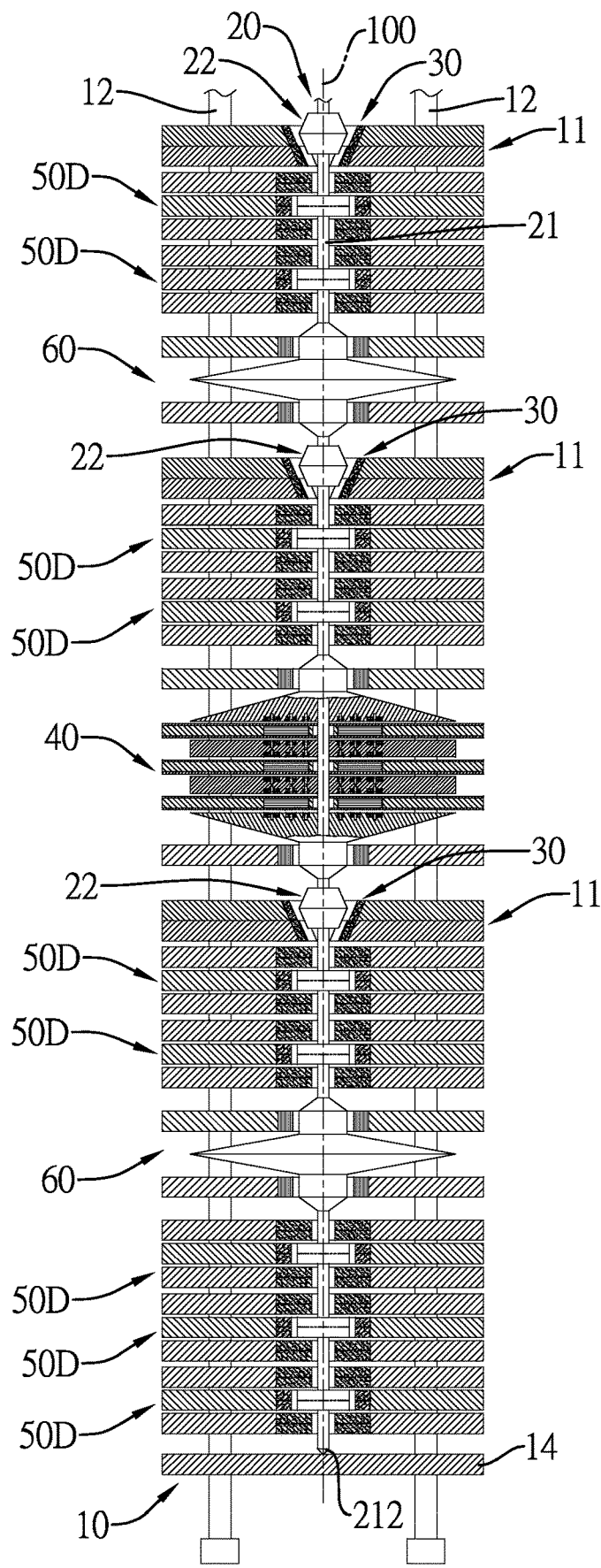
FIG. 12 is an enlarged cross-sectional view of a lower portion of the vertically mounted and magnetically driven power generation apparatus in FIG. 10.

With reference to FIGS. 10 to 12, another embodiment 1D of a vertically mounted and magnetically driven power generation apparatus in accordance with the present invention is taken for illustration of a large-scale power generation apparatus. As can be seen from FIGS. 10 to 12, the power generation apparatus 1D includes a support frame 10, a transmission mechanism 20, multiple magnetic drive assemblies 30, multiple power generators 40D, multiple magnetically stabilizing modules 50D, and at least one motor 60, and the present embodiment differs from the foregoing embodiments in the power generators 40D and magnetically stabilizing modules 50D.

Figure 13:
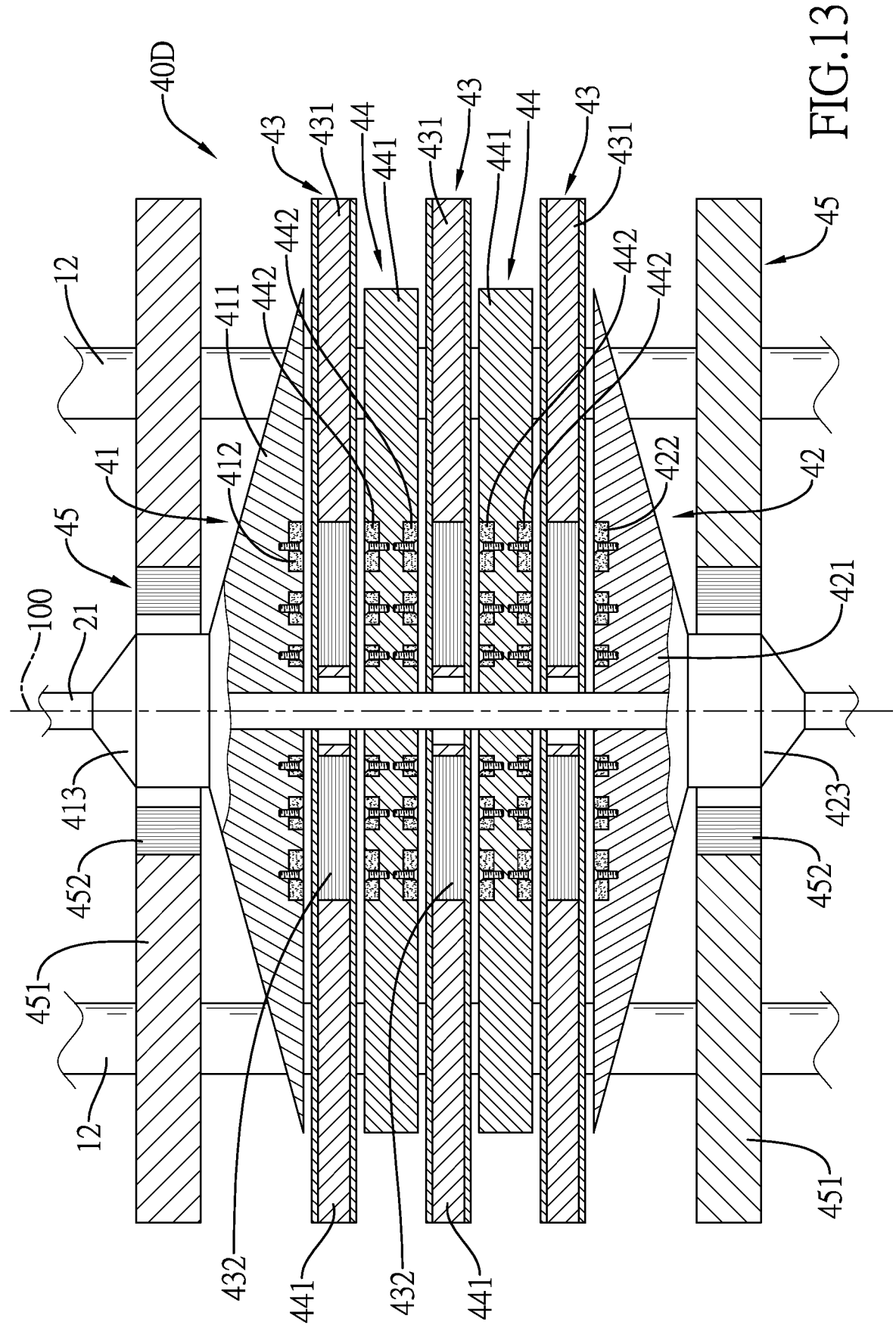
FIG. 13 is an enlarged cross-sectional view of a power generator in FIGS. 10 to 12.

With reference to FIG. 13, the multiple power generators 40D may be purely power-generating apparatuses or apparatuses featuring as both a motor and a power generator (so called electrical motor-generator), are mounted in the support frame 10, and are connected with the spindle 21 of the transmission mechanism 20. Each power generator 40D includes an upper rotor 41, multiple center rotors 44, a lower rotor 42, and multiple inner stators 43. The upper rotor 41, the multiple center rotors 44, and the lower rotor 42 are vertically spaced apart from each other, and are securely and sequentially mounted around the spindle 21 in a downward direction. The upper rotor 41, the center rotors 44 and the lower rotor 42 are rotated along with the spindle 21 to rotate around the center axis 100.

With reference to FIG. 13, the upper rotor 41 includes an upper rotor body 411 and multiple upper permanent magnets 412. The upper rotor body 411 is made of plastic steel and takes the form of a truncated cone tapering upwards. The multiple upper permanent magnets 412 are mounted on a bottom surface of the upper rotor body 411 and are distributed in rows aligned in multiple radial directions. The diameters of the upper permanent magnets 412 in each row of the multiple upper permanent magnets 412 progressively increase in a radial direction from a center to a rim of the upper rotor 41.

The lower rotor 42 is symmetrical to the upper rotor 41 in shape. The lower rotor 42 includes a lower rotor body 421 and multiple lower permanent magnets 422. The lower rotor body 421 is made of plastic steel and takes the form of a truncated cone tapering downwards. The multiple lower permanent magnets 422 are mounted on a top surface of the lower rotor body 421 and are distributed in rows aligned in multiple radial directions. The diameters of the lower permanent magnets 422 in each row of the multiple lower permanent magnets 422 progressively increase in a radial direction from a center to a rim of the lower rotor 42.

Each center rotor 44 includes a center rotor body 441 and multiple center permanent magnets 442. The center rotor body 441 takes the form of a disc and is made of plastic steel. The multiple center permanent magnets 442 are mounted on a top surface and a bottom surface of the center rotor body 441 and are distributed in rows aligned in multiple radial directions. The diameters of the center permanent magnets 442 in each row of the multiple center permanent magnets 442 progressively increase in a radial direction from a center to a rim of the center rotor 44.

The multiple inner stators 43 are securely mounted in the support frame 10, and are respectively located between the upper rotor 41 and a topmost one of the multiple center rotors 44, between every adjacent two of the multiple center rotors 44, and between a bottommost one of the multiple center rotors 44 and the lower rotor 42. Each inner stator 43 includes an inner stator board 431 and multiple inner stator windings 432. The inner stator board 431 is securely mounted in the support frame 10 and is mounted through by the spindle 21 of the transmission mechanism 20. The multiple inner stator windings 432 are mounted inside the inner stator board 431 and spread over an area covering all the rows of the multiple upper permanent magnets 412, the multiple center permanent magnets 442, and the multiple lower permanent magnets 422.

The power generator 40 further includes two outer stators 45 respectively mounted on a top end of the upper rotor 41 and the bottom end of the lower rotor 43. Each outer stator 45 has an outer stator board 451 and an outer stator winding set 452 mounted inside the outer stator board 451. The outer stator board 451 is securely mounted in the support frame 10 and fixed by the struts 12. The upper rotor 41 further includes an outer upper permanent magnet 413 mounted on a top portion of the upper rotor body 411 and located within the outer stator winding set 452 of one of the two outer stators 45. The lower rotor 42 further includes an outer lower permanent magnet 423 mounted on a bottom portion of the lower rotor body 421 and located within the outer stator winding set 452 of the other outer stator 45. By supplying power to the outer stator winding sets 452, the transmission mechanism 20 connected to the upper rotor 41 and the lower rotor 42 can be driven for the power generator 40 to also act as a motor.

With reference to FIGS. 10 to 12 and 14, the multiple magnetically stabilizing modules 50D are mounted in the support frame 10 and are located between the top board 13 and the bottom board 14. Locations of the multiple magnetically stabilizing modules 50D to be distributed depend on actual operation demands. Each magnetically stabilizing module 50D includes a positioning board 51D, a first permanent magnet ring 52, two second permanent magnet rings 54D, and an inner permanent magnet 53. The positioning board 51D is securely mounted to the struts 12 of the support frame 10. The two second permanent magnet rings 54D are securely mounted inside the positioning board 51D and are vertically spaced apart from each other by a gap. The first permanent magnet ring 52 is securely mounted inside the positioning board 51D and is located between the two second permanent magnet rings 54D. The inner permanent magnet 53 is securely mounted to the spindle 21 of the transmission mechanism 20, is located within the first permanent magnet ring 52 and between the two second permanent magnet rings 54D, and is suspended among the first permanent magnet ring 52 and the two second permanent magnet rings 54D by way of magnetic repulsion in an axial direction along the center axis 100.

Figure 14:
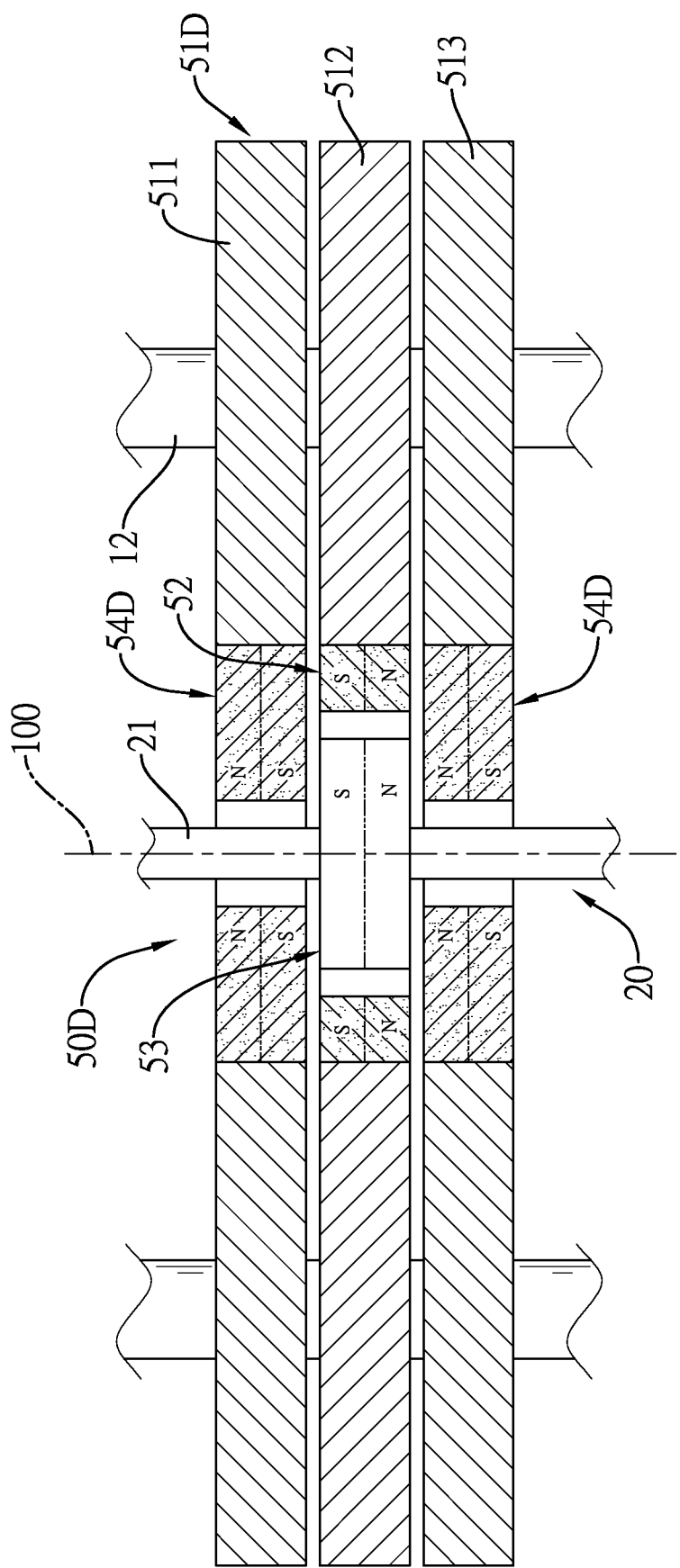
FIG. 14 is an enlarged cross-sectional view of a magnetically stabilizing module in FIGS. 10 to 12.

With reference to FIG. 14, the positioning board 51D includes a top plate 511, a middle plate 512 and a bottom plate 513 sequentially stacked to each other. A center hole aligned with the center axis 100 is formed through the top plate 511, the middle plate 512 and the bottom plate 513 of the positioning board 51D. The first permanent magnet ring 52 is mounted on an inner wall portion of the center hole inside the middle plate 512. The two second permanent magnet rings 54D are respectively mounted on inner wall portions of the center hole inside the top plate 511 and the bottom plate 513. Each of the first permanent magnet ring 52 and the two second permanent magnet rings 54D has a bore centrally formed therethrough, and the bore of the first permanent magnet ring 52 is smaller than the bores of the two second permanent magnet rings 54D in bore diameter. The inner permanent magnet 53 takes the form of a cylindrical block, and is radially spaced apart from the first permanent magnet ring 52 and is axially spaced apart from the two second permanent magnet rings 54D above and below the inner permanent magnet 53. An outer diameter of the inner permanent magnet 53 is greater than the bore diameter and is smaller than an outer diameter of the second permanent magnet rings 54D, such that the inner permanent magnet 53 is suspended among the first permanent magnet ring 52 and the two second permanent magnet rings 54D in a contactless manner by way of magnetic repulsion.

The inner permanent magnet 53 and the two second permanent magnet rings 54D above and below the inner permanent magnet 53 in the axial direction are magnetically repulsed to each other by having same magnetic polarities, and the inner permanent magnet 53 and the first permanent magnet ring 52 located around the inner permanent magnet 53 are also magnetically repulsed to each other by having same magnetic polarities. Suppose that the upper magnetic pole and the lower magnetic pole of the inner permanent magnet 53 are the magnetic south pole S and the magnetic north pole N respectively. The upper magnetic pole and the lower magnetic pole of the first permanent magnet ring 52 are chosen to be the magnetic south pole S and the magnetic north pole N respectively, such that the inner permanent magnet 53 and the first permanent magnet ring 52 located around and radially aligned with the inner permanent magnet 53 are magnetically and radially repulsed to each other. The upper magnetic pole (distal to the inner permanent magnet) and the lower magnetic pole (proximal to the inner permanent magnet) of the second permanent magnet ring 54 above the inner permanent magnet 53 are chosen to be the magnetic north pole N and the magnetic south pole S respectively, and the upper magnetic pole (proximal to the inner permanent magnet) and the lower magnetic pole (distal to the inner permanent magnet) of the second permanent magnet ring 54 below the inner permanent magnet 53 are chosen to be the magnetic north pole N and the magnetic south pole S respectively, such that the inner permanent magnet 53 is magnetically and axially repulsed by the two second permanent magnet rings 54 above and below the inner permanent magnet 53 and the transmission mechanism 20 can be stably suspended and rotated because of the radial magnetic repulsion force generated between the inner permanent magnet 53 and the first permanent magnet ring 52 and the axial magnetic repulsion force generated between the inner permanent magnet 53 and each of the second permanent magnet rings 54D.

With reference to FIGS. 10 to 12, when the large-scale power generation apparatus 1D is operated, it is possible to connect the spindle 21 of the transmission mechanism 20 to a source of kinetic energy to receive kinetic energy and rotate the transmission mechanism 20, or the motor 60 outputs rotational kinematic energy to the transmission mechanism 20. To lower air resistance when the power generation apparatus 1D is operated, the power generation apparatus 1D can be mounted in a vacuum environment.

With reference to FIGS. 10 to 12 and 13, as being subject to the magnetic force exerted by the multiple magnetic drive assemblies 30, the transmission mechanism 20 is vertically and suspendedly mounted inside the support frame 10 and is rotated around the center axis 100 of the support frame 10 so as to further rotate the upper rotor 41, the center rotors 44, and the lower rotor 42 of the power generator 40 within the support frame 10 around the center axis 100.

With reference to FIGS. 10 to 14, when the power generation apparatus 1D is operated, the upper rotor 41, the lower rotor 42, and the center rotors 44 of the power generator 40 mounted to the transmission mechanism 20 and the flywheel body 610 of the motor 60 are driven to rotate and simultaneously store electrical energy, the source of kinetic energy or the motor 30 stops outputting rotational kinematic energy once the transmission mechanism 20 and the power generator 40 reach a specific rotation speed. The upper rotor 41, the lower rotor 42, and the center rotors 44 mounted to the transmission mechanism 20 and the flywheel body 610 of the motor 60 can be still rotated by rotational inertia for a while. In view of almost no friction loss between the support frame 10 and the transmission mechanism 20, the transmission mechanism 20 can be driven to output a higher torque or a higher rotation speed.

When the transmission mechanism 20 is rotated, in the power generator 40 the upper permanent magnets 412, the lower permanent magnets 422 and the center permanent magnets 442 are moved relative to the inner stator windings 432 of the inner stators 43, or the inner stator windings 432 cut the lines of magnetic force of the upper permanent magnets 412, the lower permanent magnets 422 and the center permanent magnets 442 to generate an electromotive force for the purpose of power generation.

When the power generation apparatus 1D is operated, the multiple magnetically stabilizing modules 50 provides magnetic repulsion force between the support frame 10 and the transmission mechanism 20 in radial and axial directions to prevent the transmission mechanism from shifting, reduce chances of rotational vibration and swing, and ensure rotational stability of the transmission mechanism 20. Moreover, the top end 211 and the bottom end 212 of the spindle 21 of the transmission mechanism 20 in point contact with the top board 13 and the bottom board 14 of the support frame 10 respectively can be used to secure rotation of the transmission mechanism 20 at fixed points.

On the other hand, owing to the upper rotor 41 and the lower rotor 42 of the power generator 40 and the flywheel body 610 of the motor 60 being conical with the up-down symmetry, stable rotation of the transmission mechanism 20 can be attributable to the structure of entire rotation mechanism in the transmission mechanism 20.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vertically mounted and magnetically driven power generation apparatus, comprising:
   a support frame having:
   a center axis vertically and centrally passing through the support frame;
   multiple shelves vertically arranged and spaced apart from each other, each shelf having a through hole formed through the shelf and tapering downwards; and
   multiple struts securely connected with the multiple shelves;
   a transmission mechanism having:
   a spindle vertically mounted through the support frame along the center axis; and
   multiple magnetic driven members securely mounted around the spindle and located within the through holes of the respective shelves of the support frame;
   multiple magnetic drive assemblies mounted on inner walls of the through holes of the respective shelves and located around the respective magnetic driven members of the transmission mechanism with a gap defined between each magnetic drive assembly and a corresponding magnetic driven member, wherein the transmission mechanism is vertically and suspendedly rotatable around the center axis by magnetic repulsion forces generated between the multiple magnetic drive assemblies and the respective magnetic driven members;
   at least one power generator mounted in the support frame and connected with the spindle of the transmission mechanism; and
   multiple magnetically stabilizing modules mounted in the support frame, each magnetically stabilizing module having:
   a positioning board securely mounted to the multiple struts and having a center hole formed through the positioning board and aligned with the center axis;
   a first permanent magnet ring annularly mounted on an inner wall of the center hole of the positioning board; and
   an inner permanent magnet securely mounted to the spindle of the transmission mechanism, located within the first permanent magnet ring, and spaced apart from the first permanent magnet ring by gaps in a contactless manner by way of magnetic repulsion in a radial directions
   wherein each of the at least one power generator includes:
   an upper rotor and a lower rotor securely mounted around the spindle of the transmission mechanism, vertically spaced apart from each other, and rotated along with the spindle with respect to the center axis, wherein
   the upper rotor has:
   an upper rotor body taking the form of a truncated cone tapering upwards; and
   multiple upper permanent magnets mounted on a bottom surface of the upper rotor body, distributed in rows aligned in multiple radial directions, and progressively increasing in diameter in a radial direction from a center to a rim of the upper rotor; and
   the lower rotor is symmetrical to the upper rotor according to an up-down symmetry and has:
   a lower rotor body taking the form of a truncated cone tapering downwards; and
   multiple lower permanent magnets mounted on a top surface of the lower rotor body, distributed in rows aligned in multiple radial directions, and progressively increasing in diameter in a radial direction from a center to a rim of the lower rotor; and
   the power generator further includes an inner stator securely mounted in the support frame, located between the upper rotor and the lower rotor, and having:
   an inner stator board securely mounted in the support frame, located between the bottom surface of the upper rotor body and the top surface of the lower rotor body, and mounted through by the spindle of the transmission mechanism; and
   multiple inner stator windings mounted inside the inner stator board and spreading over an area thereon covering all the rows of the multiple upper permanent magnets and the multiple lower permanent magnet;
   wherein,
   the power generator includes two outer stators respectively mounted above the upper rotor and below the lower rotor, and each outer stator has:
   an outer stator board securely mounted in the support frame; and
   an outer stator winding set mounted inside the outer stator board;
   the upper rotor further includes an outer upper permanent magnet mounted on a top portion of the upper rotor body and located within the outer stator winding set of one of the two outer stators;
   the lower rotor further includes an outer lower permanent magnet mounted on a bottom portion of the lower rotor body and located within the outer stator winding set of the other outer stator.

2. The power generation apparatus as claimed in claim 1, wherein each of the at least one power generator includes:
   multiple inner stators mounted between the upper rotor and the lower rotor; and
   a center rotor mounted between adjacent two of the multiple inner stators and having:
   a center rotor body taking the form of a disc; and
   multiple center permanent magnets mounted on a top surface and a bottom surface of the center rotor body and distributed in rows aligned in multiple radial directions, wherein the center permanent magnets in each row of the multiple center permanent magnets progressively increase in diameter in a radial direction from a center to a rim of the center rotor, and the multiple inner stator windings of each inner stator spread over an area covering all rows of the multiple center permanent magnets of the center rotor.

3. The power generation apparatus as claimed in claim 1, wherein each magnetically stabilizing module further includes two second permanent magnet rings securely mounted inside the positioning board and vertically spaced apart from each other by a gap, wherein the first permanent magnet ring and the inner permanent magnet are located between the two second permanent magnet rings, and the inner permanent magnet is suspended among the first permanent magnet ring and the two second permanent magnet rings by way of magnetic repulsion in an axial direction along the center axis.

4. The power generation apparatus as claimed in claim 3, wherein the positioning board includes a top plate, a middle plate and a bottom plate sequentially stacked to each other, a center hole aligned with the center axis is formed through the top plate, the middle plate and the bottom plate, the first permanent magnet ring is mounted on an inner wall portion of the center hole inside the middle plate, the two second permanent magnet rings are respectively mounted on inner wall portions of the center hole inside the top plate and the bottom plate, each of the first permanent magnet ring and the two second permanent magnet rings has a bore centrally formed therethrough, and the bore of the first permanent magnet ring is smaller than the bores of the two second permanent magnet rings in bore diameter, the inner permanent magnet is radially spaced apart from the first permanent magnet ring and is axially spaced apart from the two second permanent magnet rings above and below the inner permanent magnet, an outer diameter of the inner permanent magnet is greater than the bore diameter and is smaller than an outer diameter of the second permanent magnet rings, the inner permanent magnet and the two second permanent magnet rings above and below the inner permanent magnet in the axial direction are magnetically repulsed to each other by having same magnetic polarities, and the inner permanent magnet and the first permanent magnet ring located around the inner permanent magnet are magnetically repulsed to each other by having same magnetic polarities.

5. The power generation apparatus as claimed in claim 4, wherein each of the at least one power generator includes:
the upper rotor, at least one center rotor, the lower rotor, multiple inner stators and two outer stators, wherein
the upper rotor, the at least one center rotor and the lower rotor are securely mounted around the spindle of the transmission mechanism, are vertically spaced apart from each other, and are rotated along with the spindle with respect to the center axis;
each of the at least one center rotor is mounted between adjacent two of the multiple inner stators and has:
a center rotor body taking the form of a disc; and
multiple center permanent magnets mounted on a top surface and a bottom surface of the center rotor body and distributed in rows aligned in multiple radial directions;
the multiple inner stators are securely mounted in the support frame and are respectively located between the upper rotor and a topmost one of the multiple center rotors, between every adjacent two of the multiple center rotors, and between a bottommost one of the multiple center rotors and the lower rotor, and each inner stator has:
an inner stator board securely mounted to the struts of the support frame, and mounted through by the spindle of the transmission mechanism; and
multiple inner stator windings mounted inside the inner stator board and spreading over an area thereon covering all the rows of the multiple upper permanent magnets, the multiple center permanent magnets, and the multiple lower permanent magnets.

6. The power generation apparatus as claimed in claim 4, wherein
each magnetic driven member is a permanent magnet and has:
an upper driven portion being a truncated cone tapering upwards; and
a lower driven portion having a top connected with a bottom of the upper driven portion, being a truncated cone tapering downwards, and being symmetrical to the upper driven portion according to an up-down symmetry; and
a ridge line formed on a junction between the upper driven portion and the lower driven portion, and taking a form of a circle;
wherein the upper driven portion and the lower driven portion have different magnetic polarities;
each magnetic drive assembly includes a first magnetic drive member and a second magnetic drive member mounted on the inner wall of the through hole of a corresponding shelf with a bottom of the first magnetic drive member adjacent to a top of the second magnetic drive member, wherein a gap exists between a corresponding magnetic driven member and each of the first magnetic drive member and the second magnetic drive member;
each first magnetic drive member is a permanent magnet, takes an annular or conical form, and includes an upper pole portion and a lower pole portion; and
each second magnetic drive member has multiple permanent magnets, and the permanent magnets of the second magnetic drive member are bar-shaped and are annularly mounted on the inner wall of the through hole of a corresponding shelf to take the form of a truncated cone, wherein the inner surface of each bar-shaped permanent magnet facing a corresponding magnetic driven member is parallel to a peripheral surface of the lower driven portion of the corresponding magnetic driven member, each bar-shaped permanent magnet of the second magnetic drive member has an inner pole portion proximate to the center axis and an outer pole portion distal to the center axis, and the inner pole portion and the lower driven portion of the corresponding magnetic driven member have identical magnetic polarity;
wherein
the ridge line of each magnetic driven member is aligned with a junction between the upper pole portion and the lower pole portion of a corresponding first magnetic drive member, and a bottom surface of the lower driven portion of each magnetic driven member is aligned with a middle portion of an inner surface of a corresponding second magnetic drive member.

7. The power generation apparatus as claimed in claim 4, wherein the support frame further includes a top board and a bottom board located at a top portion and a bottom portion thereof and opposed to each other, the multiple shelves and the positioning boards of the multiple magnetically stabilizing modules are located between the top board and the bottom board, and the spindle has a top end and a bottom end in point contact with a bottom surface of the top board and a top surface of the bottom board respectively.

8. The power generation apparatus as claimed in claim 3, wherein
each magnetic driven member is a permanent magnet and has:
an upper driven portion being a truncated cone tapering upwards; and
a lower driven portion having a top connected with a bottom of the upper driven portion, being a truncated cone tapering downwards, and being symmetrical to the upper driven portion according to an up-down symmetry; and
a ridge line formed on a junction between the upper driven portion and the lower driven portion, and taking a form of a circle;
wherein the upper driven portion and the lower driven portion have different magnetic polarities;
each magnetic drive assembly includes a first magnetic drive member and a second magnetic drive member mounted on the inner wall of the through hole of a corresponding shelf with a bottom of the first magnetic drive member adjacent to a top of the second magnetic drive member, wherein a gap exists between a corresponding magnetic driven member and each of the first magnetic drive member and the second magnetic drive member;
each first magnetic drive member is a permanent magnet, takes an annular or conical form, and includes an upper pole portion and a lower pole portion; and
each second magnetic drive member has multiple permanent magnets, and the permanent magnets of the second magnetic drive member are bar-shaped and are annularly mounted on the inner wall of the through hole of a corresponding shelf to take the form of a truncated cone, wherein the inner surface of each bar-shaped permanent magnet facing a corresponding magnetic driven member is parallel to a peripheral surface of the lower driven portion of the corresponding magnetic driven member, each bar-shaped permanent magnet of the second magnetic drive member has an inner pole portion proximate to the center axis and an outer pole portion distal to the center axis, and the inner pole portion and the lower driven portion of the corresponding magnetic driven member have identical magnetic polarity;
wherein
the ridge line of each magnetic driven member is aligned with a junction between the upper pole portion and the lower pole portion of a corresponding first magnetic drive member, and a bottom surface of the lower driven portion of each magnetic driven member is aligned with a middle portion of an inner surface of a corresponding second magnetic drive member.

9. The power generation apparatus as claimed in claim 3, wherein the support frame further includes a top board and a bottom board located at a top portion and a bottom portion thereof and opposed to each other, the multiple shelves and the positioning boards of the multiple magnetically stabilizing modules are located between the top board and the bottom board, and the spindle has a top end and a bottom end in point contact with a bottom surface of the top board and a top surface of the bottom board respectively.

10. The power generation apparatus as claimed in claim 1, wherein
each magnetic driven member is a permanent magnet and has:
an upper driven portion being a truncated cone tapering upwards; and
a lower driven portion having a top connected with a bottom of the upper driven portion, being a truncated cone tapering downwards, and being symmetrical to the upper driven portion according to an up-down symmetry; and
a ridge line formed on a junction between the upper driven portion and the lower driven portion, and taking a form of a circle;
wherein the upper driven portion and the lower driven portion have different magnetic polarities;
each magnetic drive assembly includes a first magnetic drive member and a second magnetic drive member mounted on the inner wall of the through hole of a corresponding shelf with a bottom of the first magnetic drive member adjacent to a top of the second magnetic drive member, wherein a gap exists between a corresponding magnetic driven member and each of the first magnetic drive member and the second magnetic drive member;
each first magnetic drive member is a permanent magnet, takes an annular or conical form, and includes an upper pole portion and a lower pole portion; and
each second magnetic drive member has multiple permanent magnets, and the permanent magnets of the second magnetic drive member are bar-shaped and are annularly mounted on the inner wall of the through hole of a corresponding shelf to take the form of a truncated cone, wherein the inner surface of each bar-shaped permanent magnet facing a corresponding magnetic driven member is parallel to a peripheral surface of the lower driven portion of the corresponding magnetic driven member, each bar-shaped permanent magnet of the second magnetic drive member has an inner pole portion proximate to the center axis and an outer pole portion distal to the center axis, and the inner pole portion and the lower driven portion of the corresponding magnetic driven member have identical magnetic polarity;
wherein
the ridge line of each magnetic driven member is aligned with a junction between the upper pole portion and the lower pole portion of a corresponding first magnetic drive member, and a bottom surface of the lower driven portion of each magnetic driven member is aligned with a middle portion of an inner surface of a corresponding second magnetic drive member.

11. The power generation apparatus as claimed in claim 1, wherein the support frame further includes a top board and a bottom board located at a top portion and a bottom portion thereof and opposed to each other, the multiple shelves and the positioning boards of the multiple magnetically stabilizing modules are located between the top board and the bottom board, and the spindle has a top end and a bottom end in point contact with a bottom surface of the top board and a top surface of the bottom board respectively.

12. A vertically mounted and magnetically driven power generation apparatus comprising:
a support frame having:
a center axis vertically and centrally passing through the support frame;

multiple shelves vertically arranged and spaced apart from each other, each shelf having a through hole formed through the shelf and tapering downwards; and multiple struts securely connected with the multiple shelves;

a transmission mechanism having:

a spindle vertically mounted through the support frame along the center axis; and multiple magnetic driven members securely mounted around the spindle and located within the through holes of the respective shelves of the support frame;

multiple magnetic drive assemblies mounted on inner walls of the through holes of the respective shelves and located around the respective magnetic driven members of the transmission mechanism with a gap defined between each magnetic drive assembly and a corresponding magnetic driven member, wherein the transmission mechanism is vertically and suspendedly rotatable around the center axis by magnetic repulsion forces generated between the multiple magnetic drive assemblies and the respective magnetic driven members;

at least one power generator mounted in the support frame and connected with the spindle of the transmission mechanism; and multiple magnetically stabilizing modules mounted in the support frame, each magnetically stabilizing module having:

a positioning board securely mounted to the multiple struts and having a center hole formed through the positioning board and aligned with the center axis;

a first permanent magnet ring annularly mounted on an inner wall of the center hole of the positioning board; and an inner permanent magnet securely mounted to the spindle of the transmission mechanism, located within the first permanent magnet ring, and spaced apart from the first permanent magnet ring by gaps in a contactless manner by way of magnetic repulsion in a radial direction;

at least one motor, wherein each of the at least one motor includes:

a rotor securely mounted to the spindle of the transmission mechanism and having:

a flywheel body being disc-shaped, having an up-down symmetry, and including:

a top portion being disc-shaped and tapering upwards; and a bottom portion formed on a bottom surface of the top portion, being disc-shaped, tapering downwards, and being symmetrical to the top portion according to an up-down symmetry; and two permanent magnets respectively mounted on a top and a bottom of the flywheel body; and two stators respectively located on a top end and a bottom end of the rotor, each stator having:

a winding-fixing board; and a winding set mounted inside the winding-fixing board;

wherein the two permanent magnets of the rotor respectively mounted on the top end and the bottom end of the rotor are located within the winding sets of the respective stators.

* * * * *